US010515109B2

(12) United States Patent
Taneja et al.

(10) Patent No.: US 10,515,109 B2
(45) Date of Patent: Dec. 24, 2019

(54) REAL-TIME AUDITING OF INDUSTRIAL EQUIPMENT CONDITION

(71) Applicant: Palantir Technologies Inc., Palo Alto, CA (US)

(72) Inventors: Nikhil Taneja, New York, NY (US); Andrzej Skrodzki, London (GB)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 15/608,562

(22) Filed: May 30, 2017

(65) Prior Publication Data

US 2018/0232084 A1 Aug. 16, 2018

Related U.S. Application Data

(60) Provisional application No. 62/459,514, filed on Feb. 15, 2017.

(51) Int. Cl.
*G06F 16/48* (2019.01)
*G05B 23/02* (2006.01)
*G06F 3/048* (2013.01)

(52) U.S. Cl.
CPC ......... *G06F 16/48* (2019.01); *G05B 23/0272* (2013.01); *G06F 3/048* (2013.01)

(58) Field of Classification Search
CPC .......... G06F 11/07; G06F 17/30; G06F 3/048; G06F 16/48
See application file for complete search history.

(56) References Cited

U.S. PATENT DOCUMENTS 5,515,488 A 5/1996 Hoppe et al.
6,430,305 B1 8/2002 Decker
(Continued)

FOREIGN PATENT DOCUMENTS

CN 102546446 A 7/2012
CN 103167093 A 6/2013
(Continued)

OTHER PUBLICATIONS

"5 Great Tools for Visualizing your Twitter Followers", Amnet Blog, http://www.amnetblog.com/component/content/article/115-5-great-tools-for-visualizing-your-twitter-followers.html, (Aug. 4, 2010), 1-5.
(Continued)

*Primary Examiner* — Sherrod L Keaton
(74) *Attorney, Agent, or Firm* — Schwegman Lundberg & Woessner, P.A.

(57) ABSTRACT

A system comprising a computer-readable storage medium storing at least one program and a method for real-time auditing of industrial equipment conditions is presented. The method includes causing presentation of a user interface comprising a table view of condition factor scores associated with industrial equipment. Each of the condition factor scores provides a measure of a factor that impacts an overall functional state of the industrial equipment. The method further includes providing a selectable element operable to toggle the user interface between the table view and a detailed view of condition factor scores. In response to user selection of the selectable element, the user interface is updated to present the detailed view that includes derivation information related to the at least one condition factor score. The derivation information includes at least one formula and at least one variable value used in calculating the at least one condition factor score.

18 Claims, 21 Drawing Sheets

(56) References Cited

U.S. PATENT DOCUMENTS 6,587,108 B1 7/2003 Guerlain et al.
6,646,660 B1 11/2003 Patty
6,820,135 B1 11/2004 Dingman et al.
6,978,419 B1 12/2005 Kantrowitz
6,980,984 B1 12/2005 Huffman et al.
7,168,039 B2 1/2007 Bertram
7,461,077 B1 12/2008 Greenwood et al.
7,617,232 B2 11/2009 Gabbert et al.
7,756,843 B1 7/2010 Palmer
7,899,796 B1 3/2011 Borthwick et al.
7,917,376 B2 3/2011 Bellin et al.
7,941,321 B2 5/2011 Greenstein et al.
8,036,971 B2 10/2011 Aymeloglu et al.
8,037,046 B2 10/2011 Udezue et al.
8,046,283 B2 10/2011 Burns et al.
8,054,756 B2 11/2011 Chand et al.
8,155,900 B1* 4/2012 Adams .................... H04L 12/66 702/62
8,214,490 B1 7/2012 Vos et al.
8,229,902 B2 7/2012 Vishniac et al.
8,290,838 B1 10/2012 Thakur et al.
8,302,855 B2 11/2012 Ma et al.
8,386,377 B1 2/2013 Xiong et al.
8,473,454 B2 6/2013 Evanitsky et al.
8,484,115 B2 7/2013 Aymeloglu et al.
8,489,641 B1 7/2013 Seefeld et al.
8,577,911 B1 11/2013 Stepinski et al.
8,589,273 B2 11/2013 Creeden et al.
8,688,573 B1 4/2014 Rukonic et al.
8,744,890 B1 6/2014 Bernier et al.
8,799,799 B1 8/2014 Cervelli et al.
8,806,355 B2 8/2014 Twiss et al.
8,812,960 B1 8/2014 Sun et al.
8,924,388 B2 12/2014 Elliot et al.
8,924,389 B2 12/2014 Elliot et al.
8,938,686 B1 1/2015 Erenrich et al.
8,949,164 B1 2/2015 Mohler
9,069,842 B2 6/2015 Melby
9,100,428 B1 8/2015 Visbal
9,111,281 B2 8/2015 Stibel et al.
9,129,219 B1 9/2015 Robertson et al.
9,256,664 B2 2/2016 Chakerian et al.
9,280,618 B1 3/2016 Bruce et al.
9,286,373 B2 3/2016 Elliot et al.
9,335,911 B1 5/2016 Elliot et al.
2002/0065708 A1 5/2002 Senay et al.
2002/0095360 A1 7/2002 Joao
2002/0095658 A1 7/2002 Shulman et al.
2002/0103705 A1 8/2002 Brady
2002/0147805 A1 10/2002 Leshem et al.
2003/0126102 A1 7/2003 Borthwick
2004/0034570 A1 2/2004 Davis
2004/0111480 A1 6/2004 Yue
2004/0118933 A1* 6/2004 Readio .................... F24D 12/02 237/2 B
2004/0153418 A1 8/2004 Hanweck
2004/0236688 A1 11/2004 Bozeman
2005/0010472 A1 1/2005 Quatse et al.
2005/0086207 A1 4/2005 Heuer et al.
2005/0154628 A1 7/2005 Eckart et al.
2005/0154769 A1 7/2005 Eckart et al.
2005/0240456 A1* 10/2005 Ward .................... G06Q 40/00 705/35
2006/0026120 A1 2/2006 Carolan et al.
2006/0026170 A1 2/2006 Kreitler et al.
2006/0080283 A1 4/2006 Shipman
2006/0143034 A1 6/2006 Rothermel et al.
2006/0143075 A1 6/2006 Carr et al.
2006/0143079 A1 6/2006 Basak et al.
2007/0000999 A1 1/2007 Kubo et al.
2007/0011304 A1 1/2007 Error
2007/0038646 A1 2/2007 Thota
2007/0150801 A1 6/2007 Chidlovskii et al.
2007/0156673 A1 7/2007 Maga et al.
2007/0162454 A1 7/2007 D' Albora et al.
2007/0185867 A1 8/2007 Maga et al.
2007/0192122 A1 8/2007 Routson et al.
2007/0203762 A1* 8/2007 Cutler .................... G06Q 10/02 705/5
2007/0284433 A1 12/2007 Domenica et al.
2008/0065655 A1 3/2008 Chakravarthy et al.
2008/0069081 A1 3/2008 Chand et al.
2008/0077642 A1 3/2008 Carbone et al.
2008/0103996 A1 5/2008 Forman et al.
2008/0208735 A1 8/2008 Balet et al.
2008/0222295 A1 9/2008 Robinson et al.
2008/0243711 A1 10/2008 Aymeloglu et al.
2008/0255973 A1 10/2008 El Wade et al.
2008/0270328 A1 10/2008 Lafferty et al.
2008/0294663 A1 11/2008 Heinley et al.
2008/0313132 A1 12/2008 Hao et al.
2009/0076845 A1 3/2009 Bellin et al.
2009/0094166 A1 4/2009 Aymeloglu et al.
2009/0094270 A1 4/2009 Alirez et al.
2009/0106178 A1 4/2009 Chu
2009/0112745 A1 4/2009 Stefanescu
2009/0125359 A1 5/2009 Knapic et al.
2009/0125459 A1 5/2009 Norton et al.
2009/0132953 A1 5/2009 Reed, Jr. et al.
2009/0157732 A1 6/2009 Hao et al.
2009/0187546 A1 7/2009 Whyte
2009/0187548 A1 7/2009 Ji et al.
2009/0249244 A1 10/2009 Robinson et al.
2009/0254842 A1 10/2009 Leacock et al.
2009/0259636 A1 10/2009 Labrou et al.
2009/0271343 A1 10/2009 Vaiciulis et al.
2009/0307049 A1 12/2009 Elliott, Jr. et al.
2009/0313463 A1 12/2009 Pang et al.
2009/0319418 A1 12/2009 Herz
2009/0319515 A1 12/2009 Minton et al.
2009/0319891 A1 12/2009 MacKinlay et al.
2010/0010667 A1* 1/2010 Sauder ................. A01B 79/005 700/231
2010/0030722 A1 2/2010 Goodson et al.
2010/0031141 A1 2/2010 Summers et al.
2010/0042922 A1 2/2010 Bradateanu et al.
2010/0057622 A1 3/2010 Faith
2010/0070842 A1 3/2010 Aymeloglu et al.
2010/0098318 A1 4/2010 Anderson
2010/0106752 A1 4/2010 Eckardt, III et al.
2010/0114887 A1 5/2010 Conway et al.
2010/0131502 A1 5/2010 Fordham
2010/0161735 A1 6/2010 Sharma
2010/0191563 A1 7/2010 Schlaifer et al.
2010/0211535 A1 8/2010 Rosenberger
2010/0235915 A1 9/2010 Memon et al.
2010/0262688 A1 10/2010 Hussain et al.
2010/0293174 A1 11/2010 Bennett
2010/0312837 A1 12/2010 Bodapati et al.
2011/0040776 A1 2/2011 Najm et al.
2011/0061013 A1 3/2011 Bilicki et al.
2011/0078173 A1 3/2011 Seligmann et al.
2011/0093327 A1 4/2011 Fordyce, III et al.
2011/0099133 A1 4/2011 Chang et al.
2011/0153384 A1 6/2011 Horne et al.
2011/0173093 A1 7/2011 Psota et al.
2011/0208565 A1 8/2011 Ross et al.
2011/0208724 A1 8/2011 Jones et al.
2011/0213655 A1 9/2011 Henkin et al.
2011/0218955 A1 9/2011 Tang et al.
2011/0270604 A1 11/2011 Qi et al.
2011/0270834 A1 11/2011 Sokolan et al.
2011/0289397 A1 11/2011 Eastmond et al.
2011/0295649 A1 12/2011 Fine et al.
2011/0314007 A1 12/2011 Dassa et al.
2011/0314024 A1 12/2011 Chang et al.
2012/0004904 A1 1/2012 Shin et al.
2012/0011238 A1 1/2012 Rathod
2012/0011245 A1 1/2012 Gillette et al.
2012/0022945 A1 1/2012 Falkenborg et al.
2012/0054284 A1 3/2012 Rakshit
2012/0059853 A1 3/2012 Jagota
2012/0066166 A1 3/2012 Curbera et al.
2012/0079363 A1 3/2012 Folting et al.

(56) References Cited

U.S. PATENT DOCUMENTS

| | | | |
|---|---|---|---|
| 2012/0084117 | A1 | 4/2012 | Tavares et al. |
| 2012/0084287 | A1 | 4/2012 | Lakshminarayan et al. |
| 2012/0089606 | A1 | 4/2012 | Eshwar et al. |
| 2012/0131512 | A1 | 5/2012 | Takeuchi et al. |
| 2012/0144335 | A1 | 6/2012 | Abeln et al. |
| 2012/0158527 | A1 | 6/2012 | Cannelongo et al. |
| 2012/0159362 | A1 | 6/2012 | Brown et al. |
| 2012/0173381 | A1 | 7/2012 | Smith |
| 2012/0215784 | A1 | 8/2012 | King et al. |
| 2012/0221553 | A1 | 8/2012 | Wittmer et al. |
| 2012/0226523 | A1 | 9/2012 | Weiss et al. |
| 2012/0245976 | A1 | 9/2012 | Kumar et al. |
| 2012/0323888 | A1 | 12/2012 | Osann, Jr. |
| 2013/0016106 | A1 | 1/2013 | Yip et al. |
| 2013/0054306 | A1 | 2/2013 | Bhalla et al. |
| 2013/0055145 | A1 | 2/2013 | Antony et al. |
| 2013/0057551 | A1 | 3/2013 | Ebert et al. |
| 2013/0096988 | A1 | 4/2013 | Grossman et al. |
| 2013/0110746 | A1 | 5/2013 | Ahn |
| 2013/0151453 | A1 | 6/2013 | Bhanot et al. |
| 2013/0166348 | A1 | 6/2013 | Scotto |
| 2013/0166480 | A1 | 6/2013 | Popescu et al. |
| 2013/0185245 | A1 | 7/2013 | Anderson et al. |
| 2013/0185307 | A1 | 7/2013 | El-yaniv et al. |
| 2013/0218879 | A1 | 8/2013 | Park et al. |
| 2013/0226318 | A1 | 8/2013 | Procyk et al. |
| 2013/0238616 | A1 | 9/2013 | Rose et al. |
| 2013/0246170 | A1 | 9/2013 | Gross et al. |
| 2013/0246537 | A1 | 9/2013 | Gaddala |
| 2013/0246597 | A1 | 9/2013 | Iizawa et al. |
| 2013/0263019 | A1 | 10/2013 | Castellanos et al. |
| 2013/0268520 | A1 | 10/2013 | Fisher et al. |
| 2013/0282696 | A1 | 10/2013 | John et al. |
| 2013/0290825 | A1 | 10/2013 | Arndt et al. |
| 2013/0297619 | A1 | 11/2013 | Chandrasekaran et al. |
| 2013/0304770 | A1 | 11/2013 | Boero et al. |
| 2013/0318604 | A1 | 11/2013 | Coates et al. |
| 2014/0012796 | A1 | 1/2014 | Petersen et al. |
| 2014/0040371 | A1 | 2/2014 | Gurevich et al. |
| 2014/0053091 | A1 | 2/2014 | Hou et al. |
| 2014/0058914 | A1 | 2/2014 | Song et al. |
| 2014/0068487 | A1 | 3/2014 | Steiger et al. |
| 2014/0095509 | A1 | 4/2014 | Patton |
| 2014/0108380 | A1 | 4/2014 | Gotz et al. |
| 2014/0108985 | A1 | 4/2014 | Scott et al. |
| 2014/0123279 | A1 | 5/2014 | Bishop et al. |
| 2014/0136285 | A1 | 5/2014 | Carvalho |
| 2014/0143009 | A1 | 5/2014 | Brice et al. |
| 2014/0156527 | A1 | 6/2014 | Grigg et al. |
| 2014/0157172 | A1 | 6/2014 | Peery et al. |
| 2014/0164502 | A1 | 6/2014 | Khodorenko et al. |
| 2014/0189536 | A1 | 7/2014 | Lange et al. |
| 2014/0189870 | A1 | 7/2014 | Singla et al. |
| 2014/0195515 | A1 | 7/2014 | Baker et al. |
| 2014/0222521 | A1 | 8/2014 | Chait |
| 2014/0222784 | A1* | 8/2014 | Handler .................. G06F 17/18 707/722 |
| 2014/0222793 | A1 | 8/2014 | Sadkin et al. |
| 2014/0226010 | A1* | 8/2014 | Molin .................... G06Q 10/06 348/148 |
| 2014/0229554 | A1 | 8/2014 | Grunin et al. |
| 2014/0280056 | A1 | 9/2014 | Kelly |
| 2014/0282160 | A1 | 9/2014 | Zarpas |
| 2014/0344230 | A1 | 11/2014 | Krause et al. |
| 2014/0358829 | A1 | 12/2014 | Hurwitz |
| 2014/0366132 | A1 | 12/2014 | Stiansen et al. |
| 2015/0073929 | A1 | 3/2015 | Psota et al. |
| 2015/0073954 | A1 | 3/2015 | Braff |
| 2015/0095773 | A1 | 4/2015 | Gonsalves et al. |
| 2015/0100897 | A1 | 4/2015 | Sun et al. |
| 2015/0106170 | A1 | 4/2015 | Bonica |
| 2015/0106379 | A1 | 4/2015 | Elliot et al. |
| 2015/0134599 | A1 | 5/2015 | Banerjee et al. |
| 2015/0135256 | A1 | 5/2015 | Hoy et al. |
| 2015/0188872 | A1 | 7/2015 | White |
| 2015/0242401 | A1 | 8/2015 | Liu |
| 2015/0338233 | A1 | 11/2015 | Cervelli et al. |
| 2015/0379413 | A1 | 12/2015 | Robertson et al. |
| 2016/0004764 | A1 | 1/2016 | Chakerian et al. |
| 2016/0180557 | A1 | 6/2016 | Yousaf et al. |

FOREIGN PATENT DOCUMENTS

| | | | |
|---|---|---|---|
| CN | 102054015 | B | 5/2014 |
| DE | 102014204827 | A1 | 9/2014 |
| DE | 102014204830 | A1 | 9/2014 |
| DE | 102014204834 | A1 | 9/2014 |
| EP | 2487610 | A2 | 8/2012 |
| EP | 2858018 | A1 | 4/2015 |
| EP | 2869211 | A2 | 5/2015 |
| EP | 2889814 | A1 | 7/2015 |
| EP | 2892197 | A1 | 7/2015 |
| EP | 2963595 | A1 | 1/2016 |
| EP | 2996053 | A1 | 3/2016 |
| EP | 3035214 | | 6/2016 |
| EP | 3038002 | | 6/2016 |
| EP | 3040885 | | 7/2016 |
| WO | WO-2005116851 | A2 | 12/2005 |
| WO | WO-2012061162 | | 5/2012 |

OTHER PUBLICATIONS

"About OWA", Open Web Analytics, [Online]. Retrieved from the Internet: <URL: http://www.openwebanalytics.com/?page jd=2>, (Accessed: Jul. 19, 2013), 5 pgs.

"An Introduction to KeyLines and Network Visualization", Keylines.com, [Online]. Retrieved from the Internet: <URL: http://keylines.com/wp-content/uploads/2014/03/KeyLines-White-Paper.pdf>, (Mar. 2014), 8 pgs.

"Analytics for Data Driven Startups", Trak.io, [Online]. Retrieved from the Internet: <URL: http://trak.io/>, (Accessed: Jul. 18, 2013), 3 pgs.

"Appacts: Open Source Mobile Analytics Platform", http://www.appacts.com, (Jul. 18, 2013), 1-4.

"U.S. Appl. No. 13/827,491, Final Office Action dated Jun. 22, 2015", 28 pgs.

"U.S. Appl. No. 13/827,491, Non Final Office Action dated Oct. 9, 2015", 16 pgs.

"U.S. Appl. No. 13/827,491, Non Final Office Action dated Dec. 1, 2014", 5 pgs.

"U.S. Appl. No. 14/141,252, Final Office Action dated Apr. 14, 2016", 28 pgs.

"U.S. Appl. No. 14/141,252, Non Final Office Action dated Oct. 8, 2015", 11 pgs.

"U.S. Appl. No. 14/225,006, Advisory Action dated Dec. 21, 2015", 4 pgs.

"U.S. Appl. No. 14/225,006, Final Office Action dated Sep. 2, 2015", 28 pgs.

"U.S. Appl. No. 14/225,006, First Action Interview Pre-Interview Communication dated Feb. 27, 2015", 5 pgs.

"U.S. Appl. No. 14/225,006, First Action Interview Pre-Interview Communication dated Sep. 10, 2014", 4 pgs.

"U.S. Appl. No. 14/225,084, Examiner Interview Summary dated Jan. 4, 2016", 3 pgs.

"U.S. Appl. No. 14/225,084, Final Office Action dated Feb. 26, 2016", 14 pgs.

"U.S. Appl. No. 14/225,084, First Action Interview Pre-Interview Communication dated Feb. 20, 2015", 5 pgs.

"U.S. Appl. No. 14/225,084, First Action Interview Pre-Interview Communication dated Sep. 2, 2014", 17 pgs.

"U.S. Appl. No. 14/225,084, Non Final Office Action dated Sep. 11, 2015", 13 pgs.

"U.S. Appl. No. 14/225,084, Notice of Allowance dated May 4, 2015", 26 pgs.

"U.S. Appl. No. 14/225,160, Advisory Action dated May 20, 2015", 7 pgs.

"U.S. Appl. No. 14/225,160, Examiner Interview Summary dated Apr. 22, 2016", 7 pgs.

(56) References Cited

OTHER PUBLICATIONS

"U.S. Appl. No. 14/225,160, Final Office Action dated Jan. 25, 2016", 25 pgs.
"U.S. Appl. No. 14/225,160, Final Office Action dated Feb. 11, 2015", 30 pgs.
"U.S. Appl. No. 14/225,160, First Action Interview Pre-Interview Communication dated Jul. 29, 2014", 19 pgs.
"U.S. Appl. No. 14/225,160, First Action Interview Pre-Interview Communication dated Oct. 22, 2014", 6 pgs.
"U.S. Appl. No. 14/225,160, Non Final Office Action dated Jun. 16, 2016", 14 pgs.
"U.S. Appl. No. 14/225,160, Non Final Office Action dated Aug. 12, 2015", 23 pgs.
"U.S. Appl. No. 14/306,138, Examiner Interview Summary dated Dec. 3, 2015", 3 pgs.
"U.S. Appl. No. 14/306,138, Examiner Interview Summary dated Dec. 24, 2015", 5 pgs.
"U.S. Appl. No. 14/306,147, Final Office Action dated Dec. 24, 2015", 22 pgs.
"U.S. Appl. No. 14/319,161, Final Office Action dated Jan. 23, 2015", 21 pgs.
"U.S. Appl. No. 14/319,161, Notice of Allowance dated May 4, 2015", 6 pgs.
"U.S. Appl. No. 14/319,765, Non Final Office Action dated Feb. 1, 2016", 10 pgs.
"U.S. Appl. No. 14/323,935, Notice of Allowance dated Oct. 1, 2015", 8 pgs.
"U.S. Appl. No. 14/451,221, Non Final Office Action dated Oct. 21, 2014", 16 pgs.
"U.S. Appl. No. 14/463,615, Advisory Action dated Sep. 10, 2015", 3 pgs.
"U.S. Appl. No. 14/463,615, Final Office Action dated May 21, 2015", 31 pgs.
"U.S. Appl. No. 14/463,615, First Action Interview Pre-Interview Communication dated Jan. 28, 2015", 29 pgs.
"U.S. Appl. No. 14/463,615, First Action Interview Pre-Interview Communication dated Nov. 13, 2014", 4 pgs.
"U.S. Appl. No. 14/463,615, Non Final Office Action dated Dec. 9, 2015", 44 pgs.
"U.S. Appl. No. 14/479,863, First Action Interview Pre-Interview Communication dated Dec. 26, 2014", 5 pgs.
"U.S. Appl. No. 14/479,863, Notice of Allowance dated Mar. 31, 2015", 23 pgs.
"U.S. Appl. No. 14/483,527, Final Office Action dated Jun. 22, 2015", 17 pgs.
"U.S. Appl. No. 14/483,527, First Action Interview Pre-Interview Communication dated Jan. 28, 2015", 6 pgs.
"U.S. Appl. No. 14/483,527, Non Final Office Action dated Oct. 28, 2015", 20 pgs.
"U.S. Appl. No. 14/483,527, Notice of Allowance dated Apr. 29, 2016", 34 pgs.
"U.S. Appl. No. 14/552,336, First Action Interview Pre-Interview Communication dated Jul. 20, 2015", 18 pgs.
"U.S. Appl. No. 14/552,336, Notice of Allowance dated Nov. 3, 2015", 13 pgs.
"U.S. Appl. No. 14/562,524, First Action Interview Pre-Interview Communication dated Sep. 14, 2015", 12 pgs.
"U.S. Appl. No. 14/562,524, First Action Interview Pre-Interview Communication dated Nov. 10, 2015", 6 pgs.
"U.S. Appl. No. 14/571,098, Final Office Action dated Feb. 23, 2016", 37 pgs.
"U.S. Appl. No. 14/571,098, First Action Interview dated Aug. 24, 2015", 4 pgs.
"U.S. Appl. No. 14/571,098, First Action Interview Pre-Interview Communication dated Mar. 11, 2015", 4 pgs.
"U.S. Appl. No. 14/571,098, First Action Interview Pre-Interview Communication dated Aug. 5, 2015", 4 pgs.
"U.S. Appl. No. 14/571,098, First Action Interview Pre-Interview Communication dated Nov. 10, 2015", 5 pgs.
"U.S. Appl. No. 14/631,633, First Action Interview Pre-Interview Communication dated Sep. 10, 2015", 5 pgs.
"U.S. Appl. No. 14/676,621, Examiner Interview Summary dated Jul. 30, 2015", 5 pgs.
"U.S. Appl. No. 14/676,621, Final Office Action dated Oct. 29, 2015", 10 pgs.
"U.S. Appl. No. 14/746,671, First Action Interview Pre-Interview Communication dated Nov. 12, 2015", 19 pgs.
"U.S. Appl. No. 14/746,671, Notice of Allowance dated Jan. 21, 2016", 7 pgs.
"U.S. Appl. No. 14/800,447, First Action Interview Pre-Interview Communication dated Dec. 10, 2015", 26 pgs.
"U.S. Appl. No. 14/813,749, Final Office Action dated Apr. 8, 2016", 80 pgs.
"U.S. Appl. No. 14/813,749, Non Final Office Action dated Sep. 28, 2015", 22 pgs.
"U.S. Appl. No. 14/842,734, First Action Interview Pre-Interview Communication dated Nov. 19, 2015", 17 pgs.
"U.S. Appl. No. 14/858,647, Notice of Allowance dated Mar. 4, 2016", 47 pgs.
"U.S. Appl. No. 14/929,584, Final Office Action dated May 25, 2016", 42 pgs.
"U.S. Appl. No. 14/929,584, Non Final Office Action dated Feb. 4, 2016", 15 pgs.
"Apsalar—Mobile App Analytics & Advertising", https://apsalar.com/, (Jul. 18, 2013), 1-8.
"Beta Testing on the Fly", TestFlight, [Online]. Retrieved from the Internet: <URL: https://testflightapp.com/>, (Accessed: Jul. 18, 2013), 3 pgs.
"Countly", Countly Mobile Analytics, [Online]. Retrieved from the Internet: <URL: http://count.ly/products/screenshots, (accessed Jul. 18, 2013), 9 pgs.
"DISTIMO—App Analytics", [Online]. Retrieved from the Internet: <URL: http://www.distimo.com/app-analytics, (accessed Jul. 18, 2013), 5 pgs.
"European Application Serial No. 14187996.5, Communication Pursuant to Article 94(3) EPC dated Feb. 19, 2016", 9 pgs.
"European Application Serial No. 14187996.5, Extended European Search Report dated Feb. 12, 2015", 7 pgs.
"European Application Serial No. 14191540.5, Extended European Search Report dated May 27, 2015", 9 pgs.
"European Application Serial No. 14200246.8, Extended European Search Report dated May 29, 2015", 8 pgs.
"European Application Serial No. 14200298.9, Extended European Search Report dated May 13, 2015", 7 pgs.
"European Application Serial No. 15181419.1, Extended European Search Report dated Sep. 29, 2015", 7 pgs.
"European Application Serial No. 15184764.7, Extended European Search Report dated Dec. 14, 2015", 8 pgs.
"European Application Serial No. 15200073.3, Extended European Search Report dated Mar. 30, 2016", 16 pgs.
"European Application Serial No. 15201924.6, Extended European Search Report dated Apr. 25, 2016", 8 pgs.
"European Application Serial No. 15202919.5, Extended European Search Report dated May 9, 2016", 13 pgs.
"European Application Serial No. 16152984.7, Extended European Search Report dated Mar. 24, 2016", 8 pgs.
"Flurry Analytics", [Online]. Retrieved from the Internet: <URL: http://www.flurry.com/, (accessed Jul. 18, 2013), 14 pgs.
"Google Analytics Official Website—Web Analytics & Reporting", [Online]. Retrieved from the Internet: <URL: http ://www.google.com/analytics/index.html, (accessed Jul. 18, 2013), 22 pgs.
"Great Britain Application Serial No. 1404486.1, Combined Search Report and Examination Report dated Aug. 27, 2014", 5 pgs.
"Great Britain Application Serial No. 1404486.1, Office Action dated May 21, 2015", 2 pgs.
"Great Britain Application Serial No. 1404489.5, Combined Search Report and Examination Report dated Aug. 27, 2014", 5 pgs.
"Great Britain Application Serial No. 1404489.5, Office Action dated May 21, 2015", 3 pgs.
"Great Britain Application Serial No. 1404489.5, Office Action dated Oct. 6, 2014", 1 pgs.

(56) References Cited

OTHER PUBLICATIONS

"Great Britain Application Serial No. 1404499.4, Combined Search Report and Examination Report dated Aug. 20, 2014", 6 pgs.
"Great Britain Application Serial No. 1404499.4, Office Action dated Jun. 11, 2015", 5 pgs.
"Great Britain Application Serial No. 1404499.4, Office Action dated Sep. 29, 2014", 1 pg.
"Help File for ModelRisk Version 5—Part 1", Vose Software, (2007), 375 pgs.
"Help File for ModelRisk Version 5—Part 2", Vose Software, (2007), 362 pgs.
"Hunchlab: Heat Map and Kernel Density Calculation for Crime Analysis", Azavea Journal, [Online]. Retrieved from the Internet: <www.azavea.com/blogs/newsletter/v4i4/kernel-density-capabilities-added-to-hunchlab>, (Sep. 9, 2014), 2 pgs.
"KeyLines Datasheet", Keylines.com, [Online]. Retrieved from the Internet: <URL: http://keylines.com/wp-content/uploads/2014/03/KeyLines-datasheet.pdf>, (Mar. 2014), 2 pgs.
"Mixpanel: Actions speak louder than page views", Mobile Analytics, [Online]. Retrieved from the Internet: <URL: https://mixpanel.com/>, (Accessed: Jul. 18, 2013), 13 pgs.
"Mobile App Marketing & Analytics", Localytics, [Online]. Retrieved from the Internet: <URL: http://www.localytics.com/>, (Accessed: Jul. 18, 2013), 12 pgs.
"Mobile Web", Wikipedia:, [Online] retrieved from the internet:https://en.wikipedia.org/w/index.php?title=Mobile Web&oldid=643800164, (Jan. 23, 2015), 6 pgs.
"More than android analytics", UserMetrix, [Online]. Retrieved from the Internet: <URL: http://usermetrix.com/android-analytics>, (Accessed: Jul. 18, 2013), 3 pgs.
"More Than Mobile Analytics", Kontagent, [Online]. Retrieved from the Internet: <URL: http://www. kontagent. com/>, (Accessed: Jul. 18, 2013), 9 pgs.
"Multimap", Wikipedia, [Online]. Retrieved from the Internet: <URL: https://en.wikipedia.org/w/index.php?title=Multimap&oldid=530800748>, (Jan. 1, 2013), 2 pgs.
"Netherlands Application Serial No. 2012417, Netherlands Search Report dated Sep. 18, 2015", W/ English Translation, 9 pgs.
"Netherlands Application Serial No. 2012438, Search Report dated Sep. 21, 2015", 8 pgs.
"New Zealand Application Serial No. 622473, First Examination Report dated Mar. 27, 2014", 3 pgs.
"New Zealand Application Serial No. 622473, Office Action dated Jun. 19, 2014", 2 pgs.
"New Zealand Application Serial No. 622513, Office Action dated Apr. 3, 2014", 2 pgs.
"New Zealand Application Serial No. 628161, First Examination Report dated Aug. 25, 2014", 2 pgs.
"Piwik—Free Web Analytics Software", Piwik, [Online]. Retrieved from the Internet: <URL: http://piwik.org/>, (Accessed: Jul. 19, 2013), 18 pgs.
"Realtime Constant Customer Touchpoint", Capptain—Pilot your apps, [Online] retrieved from the internet: <http://www.capptain.com>, (accessed Jul. 18, 2013), 6 pgs.
"Refresh CSS ellipsis when resizing container", Stack Overflow, [Online]. Retrieved from the Internet: <URL: http://stackoverflow.com/questions/17964681/refresh-css-ellipsis-when-resizing-container>, (Accessed: May 18, 2015), 1 pg.
"SAP BusinessObjects Explorer Online Help", SAP BusinessObjects, (Mar. 19, 2012), 68 pgs.
"Visualizing Threats: Improved Cyber Security Through Network Visualization", Keylines.com, [Online] retrieved from the internet: <http://keylines.com/wp-content/uploads/2014/04/Visualizing-Threats1.pdf>, (May 12, 2014), 10 pgs.
"Welcome to StatCounter—Visitor Analysis for Your Website", StatCounter, [Online]. Retrieved from the Internet: <URL: http://statcounter.com/>, (Accessed: Jul. 19, 2013), 17 pgs.
Andrew, G. Psaltis, "Streaming Data—Designing the real-time pipeline", vol. MEAP V03, (Jan. 16, 2015), 16 pgs.
Celik, T, "CSS Basic User Interface Module Level 3 (CSS3 UI)", Section 8; Resizing and Overflow, [Online] retrieved from the internet: <http://www.w3.org/TR/2012/WD-css3-ui-20120117/#resizing-amp-overflow>, (Jan. 17, 2012), 1-58.
Chaudhuri, Surajit, et al., "An Overview of Business Intelligence Technology", Communications of the ACM, vol. 54, No. 8., (Aug. 2011), 88-98.
Cohn, David, et al., "Semi-supervised Clustering with User Feedback", Cornell University, (2003), 9 pgs.
Gill, Leicester, et al., "Computerised linking of medical methodological guidelines", 3rournal of Epidemiolog and Coimmunity Health 47, (1993), pp. 316-319.
Gorr, et al., "Crime Hot Spot Forecasting: Modeling and Comparative Evaluation", Grant 98-IJ-CX-K005, (May 6, 2002), 37 pgs.
Gu, Lifang, et al., "Record Linkage: Current Practice and Future Directions", (Jan. 15, 2004), 32 pgs.
Hansen, D., et al., "Analyzing Social Media Networks with NodeXL: Insights from a Connected World", Chapter 4 & Chapter 10, (Sep. 2010), 38 pages.
Hua, Yu, et al., "A Multi-attribute Data Structure with Parallel Bloom Filters for Network Services", HiPC 2006, LNCS 4297, (2006), 277-288.
Jan-Keno, Janssen, "Wo bist'n du?—Googles Geodienst Latitude", Not in English, [Online] retrieved from the internet:http://www.heise.de/artikel-archiv/ct/2011/03/086/@00250@/ct.11.03.086-088.pdf, (Jan. 17, 2011), 86-88.
Manno, et al., "Introducing Collaboration in Single-user Applications through the Centralized Control Architecture", (2010), 10 pgs.
Phillip, J Windley, "The Live Web: Building Event-Based Connections in the Cloud", Course Technology PTR, (Dec. 21, 2011), 61 pgs.
Sigrist, Christian, et al., "PROSITE, a Protein Domain Database for Functional Characterization and Annotation", Nucleic Acids Research, vol. 38, (2010), D161-D166.
Valentini, Giorgio, et al., "Ensembles of Learning Machines", Lecture Notes in Computer Science: Neural Nets, Springer Berlin Heidelberg, (Sep. 26, 2002), 3-20.
Wang, Guohua, et al., "Research on a Clustering Data De-Duplication Mechanism Based on Bloom Filter", IEEE, (2010), 5 pgs.
Winkler, William E, et al., "Record Linkage Software and Methods for Merging Administrative Lists", Bureau of the Census Statistical Research Division :Statistical Research Report Series, No. RR2001/03, (Jul. 23, 2001), 11 pgs.
"European Application Serial No. 18155334.8, Extended European Search Report dated Oct. 22, 2018", 10 pgs.
"European Application Serial No. 18155334.8, Partial European Search Report dated Jul. 18, 2018", 12 pgs.

* cited by examiner 1000 1002 1004

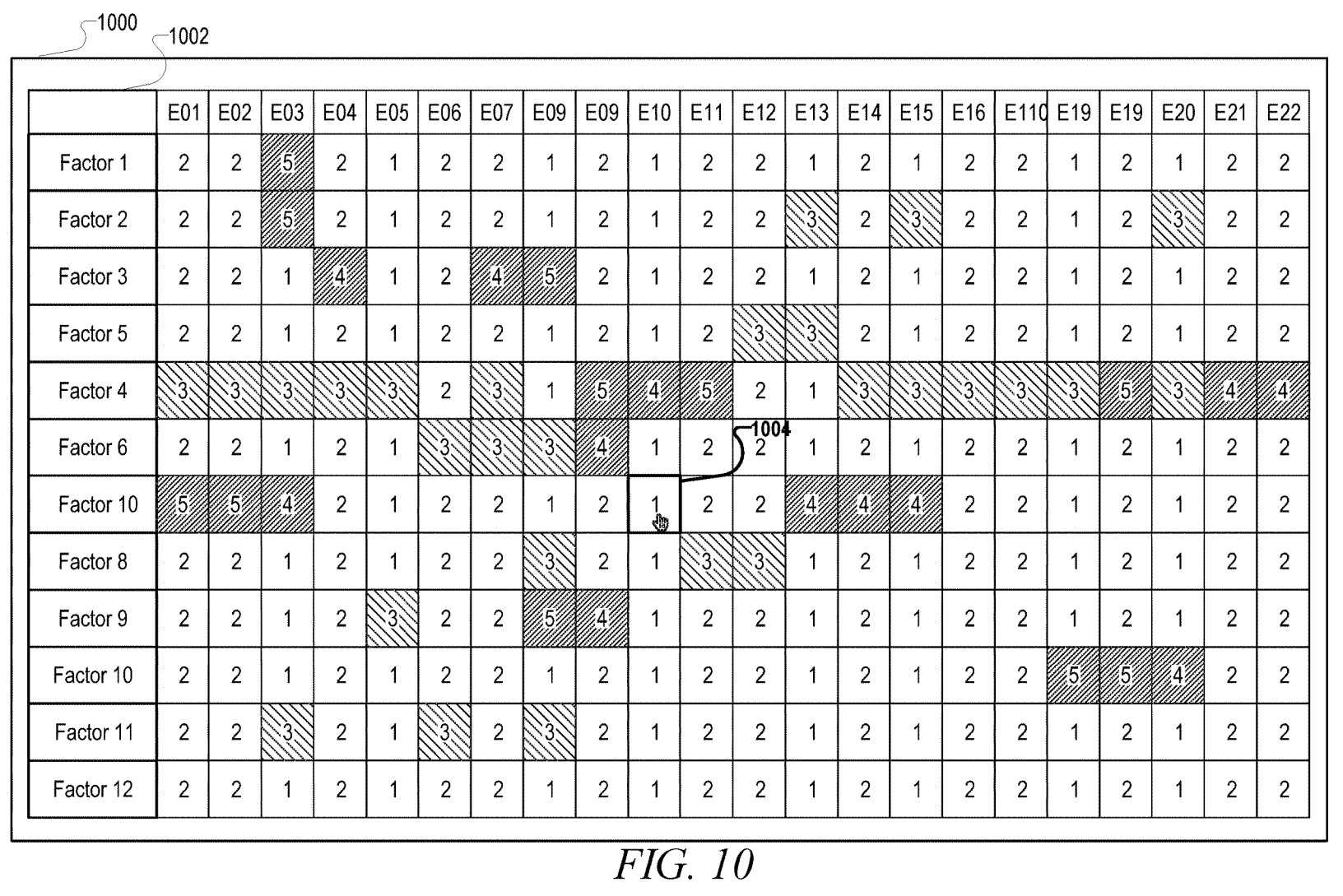

| | E01 | E02 | E03 | E04 | E05 | E06 | E07 | E09 | E09 | E10 | E11 | E12 | E13 | E14 | E15 | E16 | E110 | E19 | E19 | E20 | E21 | E22 |
|---|---|---|---|---|---|---|---|---|---|---|---|---|---|---|---|---|---|---|---|---|---|---|
| Factor 1 | 2 | 2 | 5 | 2 | 1 | 2 | 2 | 1 | 2 | 1 | 2 | 2 | 1 | 2 | 1 | 2 | 2 | 1 | 2 | 1 | 2 | 2 |
| Factor 2 | 2 | 2 | 5 | 2 | 1 | 2 | 2 | 1 | 2 | 1 | 2 | 2 | 3 | 2 | 3 | 2 | 2 | 1 | 2 | 3 | 2 | 2 |
| Factor 3 | 2 | 2 | 1 | 4 | 1 | 2 | 4 | 5 | 2 | 1 | 2 | 2 | 1 | 2 | 1 | 2 | 2 | 1 | 2 | 1 | 2 | 2 |
| Factor 5 | 2 | 2 | 1 | 2 | 1 | 2 | 2 | 1 | 2 | 1 | 2 | 3 | 3 | 2 | 1 | 2 | 2 | 1 | 2 | 1 | 2 | 2 |
| Factor 4 | 3 | 3 | 3 | 3 | 3 | 2 | 3 | 1 | 5 | 4 | 5 | 2 | 1 | 3 | 3 | 3 | 3 | 3 | 5 | 3 | 4 | 4 |
| Factor 6 | 2 | 2 | 1 | 2 | 1 | 3 | 3 | 3 | 4 | 1 | 2 | 2 | 1 | 2 | 1 | 2 | 2 | 1 | 2 | 1 | 2 | 2 |
| Factor 10 | 5 | 5 | 4 | 2 | 1 | 2 | 2 | 1 | 2 | 1 | 2 | 2 | 4 | 4 | 4 | 2 | 2 | 1 | 2 | 1 | 2 | 2 |
| Factor 8 | 2 | 2 | 1 | 2 | 1 | 2 | 2 | 3 | 2 | 1 | 3 | 3 | 1 | 2 | 1 | 2 | 2 | 1 | 2 | 1 | 2 | 2 |
| Factor 9 | 2 | 2 | 1 | 2 | 3 | 2 | 2 | 5 | 4 | 1 | 2 | 2 | 1 | 2 | 1 | 2 | 2 | 1 | 2 | 1 | 2 | 2 |
| Factor 10 | 2 | 2 | 1 | 2 | 1 | 2 | 2 | 1 | 2 | 1 | 2 | 2 | 1 | 2 | 1 | 2 | 2 | 5 | 5 | 4 | 2 | 2 |
| Factor 11 | 2 | 2 | 3 | 2 | 1 | 3 | 2 | 3 | 2 | 1 | 2 | 2 | 1 | 2 | 1 | 2 | 2 | 1 | 2 | 1 | 2 | 2 |
| Factor 12 | 2 | 2 | 1 | 2 | 1 | 2 | 2 | 1 | 2 | 1 | 2 | 2 | 1 | 2 | 1 | 2 | 2 | 1 | 2 | 1 | 2 | 2 |

*FIG. 10*

| Selected Facilities: 1 ▼ | Reload ⟳ | E01 | E02 | E03 | Equip. Att. ▼ E04 | E05 | E06 | Select Equipment Types ▼ E07 | E08 | E10 | E11 | E12 | E13 | E14 | User Guides E15 | ◯ Table View E16 |
|---|---|---|---|---|---|---|---|---|---|---|---|---|---|---|---|---|
| EQUIPMENT NAME | | E01 | E02 | E03 | E04 | E05 | E06 | E07 | E08 | E10 | E11 | E12 | E13 | E14 | E15 | E16 |
| ▾SUMMARY | | | | | | | | | | | | | | | | |
| OVERALL CONDITION | | 54 | 48 | 57 | 49 | 54 | 49 | 56 | 39 | 46 | 48 | 48 | 48 | 54 | 40 | 46 |
| AVERAGE CONDITION | | 2.84 | 2.53 | 3.00 | 2.58 | 3.00 | 2.58 | 2.95 | 2.05 | 2.42 | 2.53 | 2.53 | 3.00 | 2.84 | 2.11 | 2.42 |
| ALLOCATED PRODUCTION | | 1455 | 4873 | 5971 | 1549 | 3576 | 339 | 5815 | 8596 | 9393 | 12665 | 5093 | 2289 | 2289 | 1652 | 3433 |
| PRODUCTION AT RISK | | 670 | 1860 | 2985 | 611 | 1788 | 134 | 2831 | 2262 | 3337 | 4833 | 1943 | 1145 | 1306 | 456 | 1220 |
| FACTOR 1 | | 3 | 3 | 3 | 3 | 5 | 3 | 5 | 2 | 2 | 3 | 3 | 5 | 5 | 2 | 3 |
| FACTOR 2 | | 5 | 5 | 5 | 5 | 1 | 5 | 1 | 3 | 2 | 1 | 5 | 5 | 2 | 2 | 5 |
| FACTOR 3 | | 1 | 1 | 1 | 1 | 1 | 1 | 1 | 1 | 1 | 1 | 1 | 1 | 1 | 1 | 1 |

| Selected Facilities: 1 ▽ | Reload ↻ | | Equip. Att. ▽ | | Select Equipment Types ▽ | | | | | User Guides | | | ○ Table View |
|---|---|---|---|---|---|---|---|---|---|---|---|---|---|
| EQUIPMENT NAME | E01 | E02 | E03 | E04 | E05 | E06 | E07 | E08 | E10 | E11 | E12 | E13 | E14 | E15 | E16 |
| ▼ SUMMARY | | | | | | | | | | | | | | | |
| OVERALL CONDITION | 54 | 48 | 57 | | | | E07 – FACTOR 3 | | | | 48 | 48 | 54 | 40 | 46 |
| AVERAGE CONDITION | 2.84 | 2.53 | 3.00 | | ◁ 4 ▷ | | Rise in factor 3 | | | 2.53 | 3.00 | 2.84 | 2.11 | 2.42 |
| ALLOCATED PRODUCTION | 1455 | 4873 | 5971 | | 1602 | | | 1604 | | 5093 | 2289 | 2289 | 1652 | 3433 |
| PRODUCTION AT RISK | 670 | 1860 | 2985 | | | | Cancel Save | 1606 | | 1943 | 1145 | 1306 | 456 | 1220 |
| FACTOR 1 | 3 | 3 | 3 | 3 | 3 | 3 | | 3 | | 3 | 3 | 5 | 2 | 3 |
| FACTOR 2 | 5 | 5 | 5 | 5 | 5 | 5 | 5 | | 2 | 5 | 5 | 5 | 2 | 5 |
| FACTOR 3 | 1 | 1 | 1 | 1 | 1 | 1 | 1 | 1 | 1 | 1 | 1 | 1 | 1 | 1 |

| Selected Facilities: 1 | Reload ↻ | Equip. Att. | Select Equipment Types | User Guides | ⊙ Detailed View |
|---|---|---|---|---|---|
| EQUIPMENT NAME | | E08 | | E09 | |
| FACTOR 1 | [5] TYPE 1 | | | [3] TYPE 7 | |
| FACTOR 2 | [1] Current Pressure: 120.3258 | | | [5] Current Pressure: 435.7889 | |
| FACTOR 3 | [1] Temperature: 122.33 | | | [1] Temperature: 221.89 | |
| FACTOR 4 | [1] Volume: 0.034 | | | [4] Volume: 0.455 | |

| Selected Facilities: 1 ▼ | Reload ⟳ | | | Equip. Att. ▼ | | Select Equipment Types ▼ | | | | | | User Guides | | ○ Table View |
|---|---|---|---|---|---|---|---|---|---|---|---|---|---|---|
| EQUIPMENT NAME | E01 | E02 | E03 | E04 | E05 | E0 ☐ All<br>☐ TYPE 1<br>☐ TYPE 2<br>☐ TYPE 3<br>☐ TYPE 4<br>☐ TYPE 5<br>☐ TYPE 6<br>☐ TYPE 7<br>☐ TYPE 8 | | | E11 | E12 | E13 | E14 | E15 | E16 |
| ▸ SUMMARY | | | | | | | | | | | | | | |
| OVERALL CONDITION | 54 | 48 | 57 | 49 | 54 | | | | 48 | 48 | 48 | 54 | 40 | 46 |
| AVERAGE CONDITION | 2.84 | 2.53 | 3.00 | 2.58 | 3.00 | | | 2. | 2.53 | 2.53 | 3.00 | 2.84 | 2.11 | 2.42 |
| ALLOCATED PRODUCTION | 1455 | 4873 | 5971 | 1549 | 3576 | 5815 | 8596 | 9393 | 12665 | 5093 | 2289 | 2289 | 1652 | 3433 |
| PRODUCTION AT RISK | 670 | 1860 | 2985 | 611 | 1788 | 2831 | 2262 | 3337 | 4833 | 1943 | 1145 | 1306 | 456 | 1220 |
| FACTOR 1 | 3 | 3 | 3 | 3 | 3 | 3 | 3 | 2 | 3 | 3 | 3 | 3 | 2 | 3 |
| FACTOR 2 | 5 | 5 | 5 | 5 | 5 | 5 | 3 | 2 | 3 | 5 | 5 | 5 | 2 | 5 |
| FACTOR 3 | 1 | 1 | 1 | 1 | 1 | 1 | 1 | 1 | 1 | 1 | 1 | 1 | 1 | 1 |

SCORECARD - CALCULATIONS METHODOLOGY AND ASSUMPTIONS

ASSUMPTIONS
- FACTOR 1: use highest value over past month
  - If TEMP. > 115, scored as "High TEMP."
  - If TEMP. <= 115, scored as "Low TEMP."
- FACTOR 2: use highest value over past month
  - If TEMP. > 115, scored as "High TEMP."
  - If TEMP. <= 115, scored as "Low TEMP."
- FACTOR 3: use highest value over past month
- FACTOR 4: use highest value over past month
- FACTOR 5: use highest value over past month (if no values in past month, use most recent value available)
- FACTOR 6: use highest value (rate of change) over past month
- FACTOR 7: use most recent value available FORMULAS
- FACTOR 8: Provided by Senior Engineers.
- FACTOR 9: Current Extrapolated Internal Pressure
- FACTOR 10: Initial Extrapolated Internal Pressure

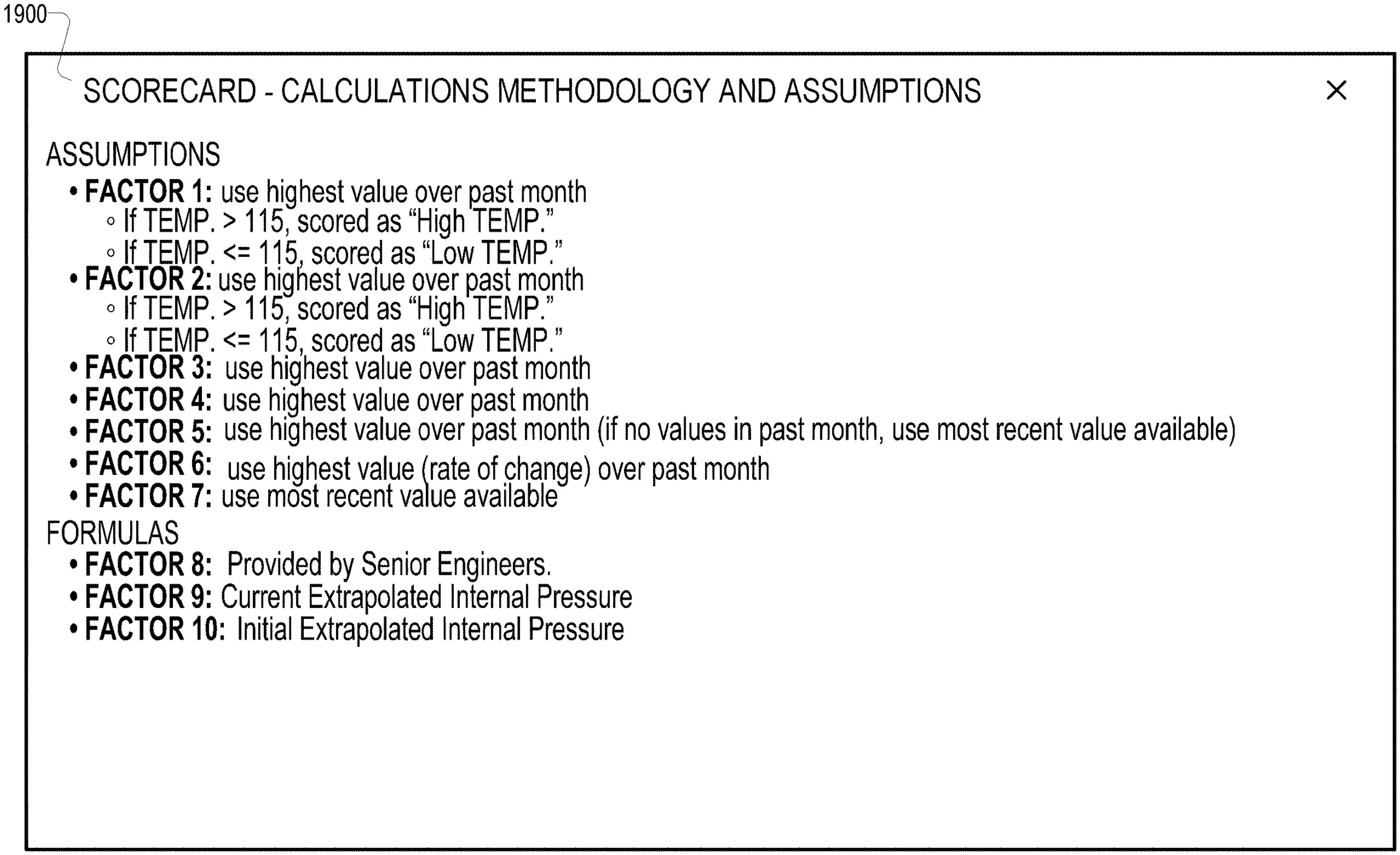

*FIG. 19*

REAL-TIME AUDITING OF INDUSTRIAL EQUIPMENT CONDITION

PRIORITY CLAIM

This application claims the benefit of priority of U.S. Provisional Application Ser. No. 62/459,514, titled "REAL-TIME AUDITING OF INDUSTRIAL EQUIPMENT CONDITION," filed on Feb. 15, 2017, which is hereby incorporated by reference.

TECHNICAL FIELD

The subject matter disclosed herein relates to real-time monitoring of conditions of industrial equipment. In particular, example embodiments relate to systems and methods for analyzing data associated with industrial equipment to derive qualitative measures of industrial equipment conditions and provide user interfaces (UIs) to present the derived qualitative measures of industrial equipment conditions.

BACKGROUND

Industrial equipment (e.g., machinery) is often equipped with sensors to provide insights regarding the ongoing performance and condition of the equipment to aid in decisions regarding maintenance and replacement of such equipment. Each piece of equipment may have several different sensors, each of which is responsible for providing output data related to different functional aspects of the equipment. Given the large quantity of sensor data output for each piece of equipment, it is often difficult to accurately interpret and understand the data that is output. For example, conventional methods involve performing calculations using the sensor data in accordance with a standard rubric. However, the conventional methodologies are very time consuming, and their result is simply a snapshot of the condition of the equipment at the time of the particular sensor data used in the calculations. As a result, the insights gained from the application of these conventional methodologies do not reflect the current condition of the equipment being analyzed.

Additionally, industrial equipment is often subject to periodic reviews (e.g., annual or quarterly) to assess performance and condition of the equipment. During such reviews, the condition of the equipment is evaluated to determine whether repairs or maintenance need to occur to avoid potentially lengthy downtime of the equipment due to wear or damage. The conventional review process again involves performing calculations using the sensor data in accordance with a standard rubric. However, it is often difficult to manually collect the sensor data, and the calculations of the conventional methodologies are often too complex to produce results that are both accurate and timely. Further, in many instances, it is important for a decision maker (e.g., a human tasked with maintaining equipment in a proper working order) to understand how sensor data output is used in the calculations and what the exact values are, though the conventional methodologies typically do not provide a convenient way for the decision makers to do this. Making decisions regarding maintenance and replacement of equipment without an accurate understanding of the current condition of the equipment and the calculations used to assess the current condition may ultimately compromise the health and longevity of the equipment.

BRIEF DESCRIPTION OF THE DRAWINGS

Various ones of the appended drawings merely illustrate example embodiments of the present inventive subject matter and cannot be considered as limiting its scope.

FIG. 10 is an interface diagram illustrating a portion of a user interface (UI) that includes a table view of condition factor scores associated with a set of industrial equipment, according to some example embodiments.

FIG. 19 is an interface diagram illustrating a portion of a UI that includes a calculation methodology, according to some example embodiments.

DETAILED DESCRIPTION

Figure 1:
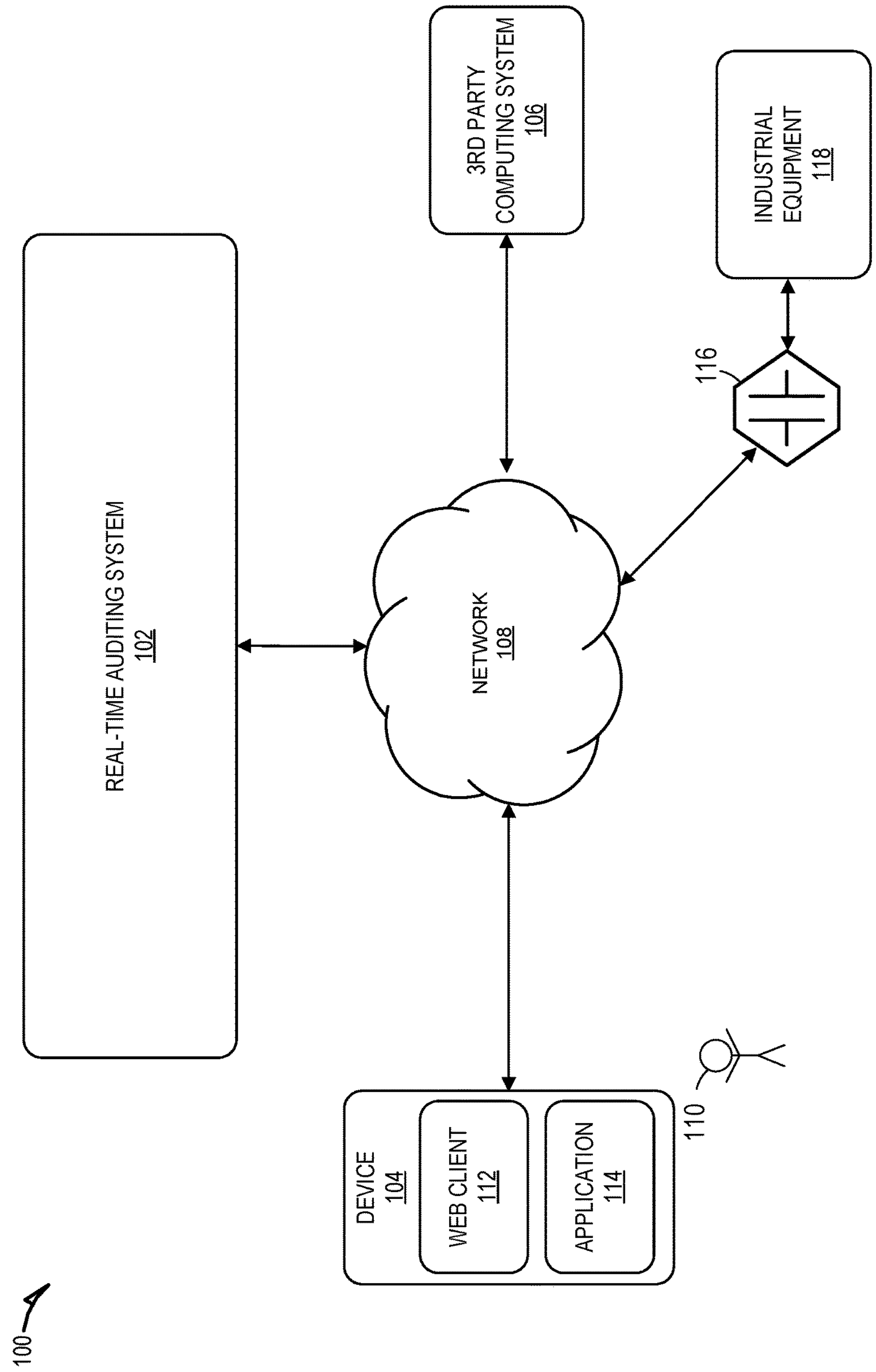
FIG. 1 is an architecture diagram depicting a data processing platform having a client-server architecture configured for exchanging data, according to some embodiments.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Aspects of the present disclosure relate to a system and methods for real-time monitoring of industrial equipment conditions. A real-time auditing system collects and consumes source data from sensors coupled to equipment (e.g., a machine or set of machines) and from human-generated reports (e.g., maintenance reports). The real-time auditing system uses the source data to determine conditions (e.g., a state of working order) of the equipment in real-time. The conditions are determined in "real-time" such that they are determined as the source data changes (e.g., as the sensor output changes). More specifically, the real-time auditing system analyzes the source data to compute scores related to various factors that impact the overall equipment condition. The factors that impact the overall equipment condition are referred to herein as "condition factors," and the scores related thereto are, accordingly, referred to herein as "condition factor scores." Each computed condition factor score provides a qualitative and quantitative measure of a functional aspect of the equipment condition. Using the condition factor scores, the real-time auditing system also determines an overall condition score that provides a qualitative and quantitative measure of an overall functional state of the equipment.

Additional aspects of the real-time auditing system involve UIs for presenting an overview of the condition factors of equipment along with the associated condition factor score of each piece of equipment. The UIs are configured to present the condition factor scores in two views: 1) a table view and 2) a detailed view. The table view includes presentation of condition factor scores for each condition factor for each piece of equipment in a simple table. The detailed view includes the condition factor scores for each condition factor for each piece of equipment along with detailed information related to how each score was derived. For example, for a particular condition factor score, the detailed view may include a presentation of any underlying formulas used to compute the score along with the variable values (e.g., sensor data values) used to generate the condition factor scores from the formulas. By providing the derivation information within the detailed view, the real-time auditing system allows for conditions of industrial equipment to be easily audited in real-time (e.g., as the conditions of the equipment change).

Additionally, the UIs allow users to filter and sort the presentation of condition factor scores by condition factors, condition factor values, equipment types, equipment features, and equipment locations. The UIs also provide users with a user guide that users may access to obtain the calculation methodology used in calculating any one of the condition factor scores. The UIs allow users to manually edit condition factor scores and create notes (e.g., textual or audio) to associate with edited scores.

The UIs also includes multiple views for presenting aggregate condition data (e.g., overall condition scores and condition factor scores) associated with sets of equipment. For example, the UIs may include a view for presenting aggregate condition data associated with a facility (e.g., a manufacturing facility) that includes a set of equipment. As another example, the UIs may include a view for presenting aggregate condition data associated with an asset that includes multiple facilities, each of which includes a set of equipment. As yet another example, the UIs may include a view for presenting aggregate condition data associated with a region (e.g., a geographic region) that includes multiple assets as well as a global view that aggregates condition data from multiple regions. Accordingly, the real-time monitoring system may find application in monitoring a variety of industrial equipment that operates in a variety of industrial contexts, including manufacturing and processing facilities such as consumer product manufacturing facilities, chemical plants, oil drilling platforms, oil refineries, drug manufacturing facilities, aircraft manufacturing facilities, automotive manufacturing facilities, and the like.

FIG. 1 is an architecture diagram depicting a network system 100 having a client-server architecture configured for exchanging data, according to an example embodiment. While the network system 100 shown in FIG. 1 may employ a client-server architecture, the present inventive subject matter is, of course, not limited to such an architecture, and could equally well find application in an event-driven, distributed, or peer-to-peer architecture system, for example. Moreover, it shall be appreciated that although the various functional components of the network system 100 are discussed in the singular sense, multiple instances of one or more of the various functional components may be employed.

As shown, the network system 100 includes a real-time auditing system 102, a device 104, and a third-party computing system 106, all communicatively coupled to each other via a network 108. The real-time auditing system 102 may be implemented in a special-purpose (e.g., specialized) computer system, in whole or in part, as described below.

Also shown in FIG. 1 is a user 110, who may be a human user (e.g., a human being), a machine user (e.g., a computer configured by a software program to interact with the device 104), or any suitable combination thereof (e.g., a human assisted by a machine or a machine supervised by a human). The user 110 is associated with the device 104 and may be a user of the device 104. For example, the device 104 may be a desktop computer, a vehicle computer, a tablet computer, a navigational device, a portable media device, a smart phone, or a wearable device (e.g., a smart watch, smart glasses, smart clothing, or smart jewelry) belonging to the user 110.

The device 104 may also include any one of a web client 112 or application 114 to facilitate communication and interaction between the user 110 and the real-time auditing system 102. In various embodiments, information communicated between the real-time auditing system 102 and the device 104 may involve user-selected functions available through one or more user interfaces (UIs). The UIs may be specifically associated with the web client 112 (e.g., a browser) or the application 114. Accordingly, during a communication session with the device 104, the real-time auditing system 102 may provide the device 104 with a set of machine-readable instructions that, when interpreted by the device 104 using the web client 112 or the application

114, cause the device 104 to present a UI, and transmit user input received through such an UI back to the real-time auditing system 102. As an example, the UIs provided to the device 104 by the real-time auditing system 102 allow users to view information that is updated in real-time describing conditions of equipment (e.g., the information is updated as the conditions change).

The network 108 may be any network that enables communication between or among systems, machines, databases, and devices (e.g., between real-time auditing system 102 and the device 104). Accordingly, the network 108 may be a wired network, a wireless network (e.g., a mobile or cellular network), or any suitable combination thereof. The network 108 may include one or more portions that constitute a private network, a public network (e.g., the Internet), or any suitable combination thereof. Accordingly, the network 108 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a WiFi network or WiMax network), or any suitable combination thereof. Any one or more portions of the network 108 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Also shown in FIG. 1 are sensors 116 coupled to industrial equipment 118. The industrial equipment 118 may, for example, be a machine, a set of machines, or other physical components that operate within an industrial context to perform a particular industrial purpose. For example, the equipment 118 may be an assembly line or component of an assembly line operating in a manufacturing facility. The sensors 116 may be, or include, any of a variety of types of sensors that produce output data that include measurements of various operational aspects (e.g., functional attributes) of the industrial equipment 118. Depending on the type of the industrial equipment 118, the operational aspects may, for example, include engine or motor speed, torque, valve positions, precooler temperatures, deceleration, acceleration, pH, moisture, flow rate, altitude, depth/level, or flux (e.g. energy flux, heat flux, diffusion flux, volumetric flux, mass flux). A set of output data from each of the sensors 116 is collected by the real-time auditing system 102 either directly from the sensors 116 (e.g., via machine interface) or from the third-party computing system 106, which may also be in direct communication with the sensors 116.

Figure 2:
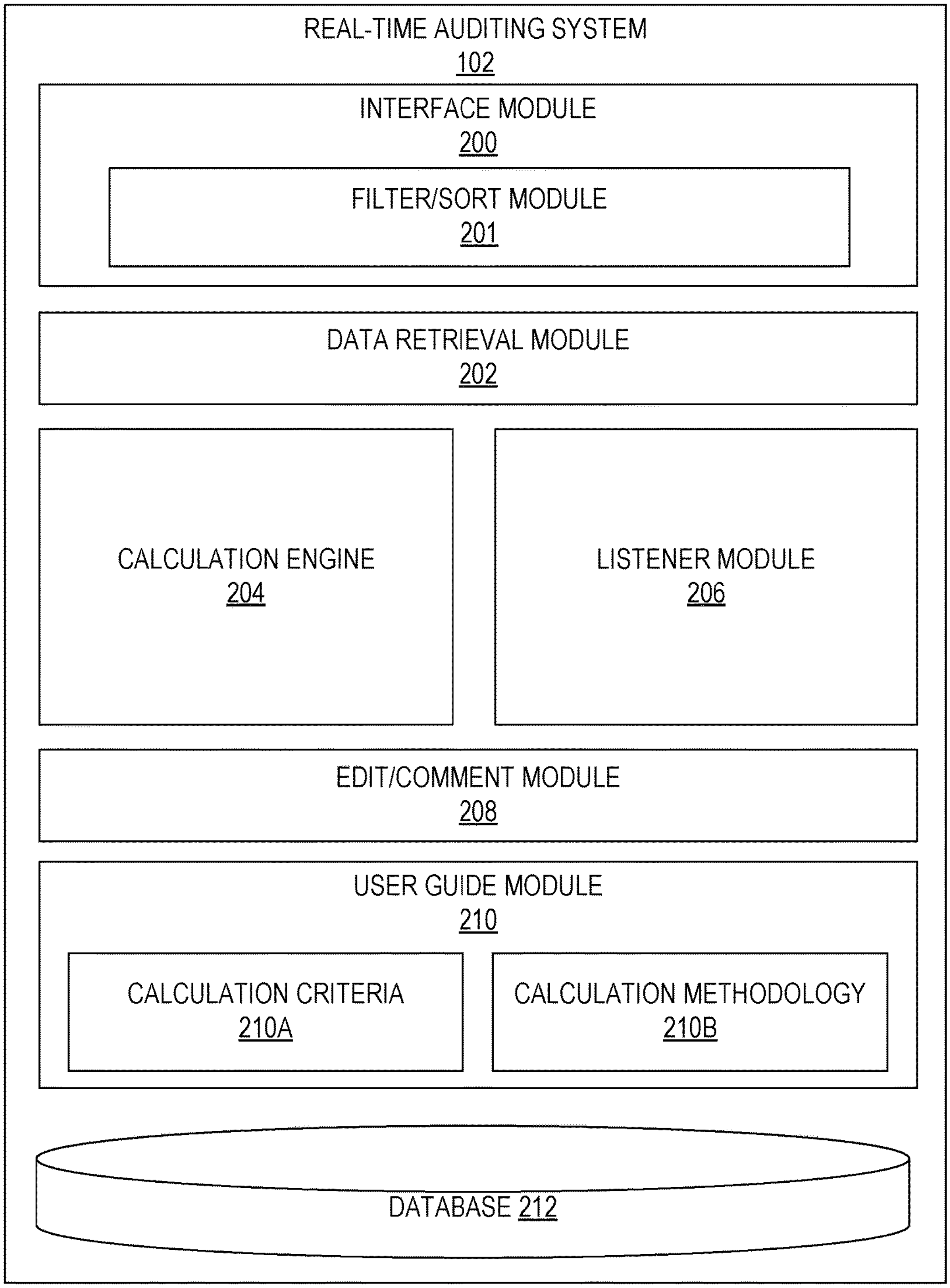
FIG. 2 is a block diagram illustrating various modules comprising a real-time auditing system, which is provided as part of the data processing platform, consistent with some embodiments.

FIG. 2 is a block diagram illustrating various modules comprising the real-time auditing system 102, consistent with some embodiments. To avoid obscuring the inventive subject matter with unnecessary detail, various functional components (e.g., modules, engines, and databases) that are not germane to conveying an understanding of the inventive subject matter have been omitted from FIG. 2. However, a skilled artisan will readily recognize that various additional functional components may be supported by the real-time auditing system 102 to facilitate additional functionality that is not specifically described herein. As shown, the real-time auditing system 102 includes: an interface module 200; a data retrieval module 202; a calculation engine 204; a listener module 206; an edit/comment module 208; a user guide module 210; and a database 212. Each of the above referenced functional components of the real-time auditing system 102 are configured to communicate with each other (e.g., via a bus, shared memory, a switch, or application programming interfaces (APIs)).

The interface module 200 receives requests from the device 104, and communicates appropriate responses to the device 104. The interface module 200 may receive requests from devices in the form of Hypertext Transfer Protocol (HTTP) requests or other web-based, API requests. For example, the interface module 200 provides a number of interfaces (e.g., APIs or UIs that are presented by the device 104) that allow data to be received by the real-time auditing system 102.

The interface module 200 also provides UIs to devices (e.g., device 104) that include graphical representations of various analytics and other output produced by the real-time auditing system 102. To provide a UI to the device 104, the interface module 200 transmits a set of machine-readable instructions to the device 104 that causes the device 104 to present the UI on a display of the device 104. The set of machine-readable instructions may, for example, include presentation data (e.g., representing the UI) and a set of instructions to display the presentation data. The device 104 may temporarily store the presentation data to enable display of the UI.

The UIs provided by the interface module 200 may include various graphs, tables, charts, and other graphics used, for example, to present condition data describing the working state of equipment. The interfaces may also include various input control elements (e.g., sliders, buttons, drop-down menus, check-boxes, and data entry fields) that allow users to specify various inputs, and the interface module 200 receives and processes user input received through such input control elements.

The UIs provided by the interface module 200 may include multiple "views" for presenting condition data to users along with a selectable element (e.g., a toggle) to switch between views. For example, the UIs provided by the interface module 200 may include a table view and a detailed view of condition data along with a toggle to switch between the table view and the detailed view. The table view includes a table in which the rows correspond to condition factors, the columns correspond to individual pieces of industrial equipment, and each entry in the table includes a condition factor score for the corresponding condition factor and individual instance of industrial equipment. The detailed view includes, for each piece of industrial equipment included in the table view, a condition factor score for each condition factor along with derivation information associated with each condition factor score. The derivation information includes underlying information used in generating a condition factor score. For example, the derivation information may include one or more variable values (e.g., corresponding to a sensor output value) used in calculating the score as well one or more formulas used to generate the score with the one or more variable values. Using the toggle button, a viewing user can easily switch between the table view and the detailed view from within the UI.

As shown, the interface module 200 includes a filter/sort module 201 configured to filter and sort condition data presented within UIs. The filter/sort module 201 may filter and/or sort information in accordance with user selections made via interactive elements (e.g., buttons, drop-down menus, check-boxes or combinations thereof) displayed in conjunction with the condition data. For example, the UIs may include selectable elements that allow the user to filter and/or sort information based on any one of condition factor, condition factor score, equipment type, equipment attributes, and equipment location (e.g., facility in which the equipment is located). Depending on the filters selected, the filtering of the condition data may include adding or removing one or more condition factor scores. Depending on the specified sorting selection, the sorting of the condition data may include displaying condition factor scores in a particular order (e.g., ascending or descending order), particular grouping (e.g., condition factor scores corresponding to equipment of the same type may be grouped together), or combinations of both. Examples of the UIs provided by the interface module 200 (e.g., to the device 104) are discussed below in reference to FIGS. 7-20.

The data retrieval module 202 is configured to retrieve and integrate source data (e.g., sensor data and report data) for analysis in the real-time auditing system 102. The source data obtained by the data retrieval module 202 includes: sensor data corresponding to data output by one or more sensors 116 coupled to the industrial equipment 118; and report data comprising information (e.g., human-generated information) describing operational aspects of the industrial equipment 118. Accordingly, in some instances, the data retrieval module 202 may retrieve sensor data through appropriate requests submitted to one or more machine interfaces of the sensors 116 that provide a direct link to the output of the sensors 116. In some instances, the data retrieval module 202 retrieves source data from the third-party computing system 106 through appropriate requests (e.g., API requests or calls) transmitted over the network 108. The data may be retrieved by the data retrieval module 202 on a constant basis or as changes to the data are detected.

In integrating the source data into the real-time auditing system 102, the data retrieval module 202 performs operations including cleaning, extracting, transforming, and translating raw data, and creating a data object for each instance of equipment (e.g., an individual machine) included in the source data. Each data object, which may be referred to as an "equipment data object," is a data structure (e.g., a table) that includes information describing the equipment, such as: an equipment identifier, a designator of equipment type, equipment age, equipment location (e.g., a particular facility, asset, or region in which the equipment resides), and current and historic condition data of the equipment. The source data that is retrieved and integrated into the real-time auditing system 102 is stored in the database 212 for subsequent processing and analysis by the real-time auditing system 102.

The calculation engine 204 is configured to analyze source data to derive condition data (e.g., individual condition factor scores and an overall condition score) describing various aspects of the condition of equipment. More specifically, the calculation engine 204 uses the source data to compute condition factor scores, each of which provides a measure (both qualitative and quantitative) of a condition factor that impacts an overall functional state of the industrial equipment 118. In other words, the condition factor score provides a measure of an aspect of equipment condition. In computing each condition factor score, the calculation engine 204 accesses a predefined formula or set of formulas corresponding to the particular condition factor score being computed. The calculation engine 204 then evaluates the formula or set of formulas using a portion of the source data (e.g., specific sensor data or report data corresponding to one or more variables included in the formula). Each computed condition factor score is stored in the database 212 (e.g., as part of the equipment data object) with a timestamp so as to maintain a record of current and historic condition factor scores associated with the industrial equipment 118.

The calculation engine 204 is further configured to derive information related to the overall condition of the industrial equipment 118. In particular, the calculation engine 204 computes an overall condition score for the industrial equipment 118 that provides a measure (that is both qualitative and quantitative) of an overall functional state (e.g., an overall condition) of the industrial equipment 118. The calculation engine 204 computes the overall condition score by aggregating the condition factor scores computed for the industrial equipment 118. For example, in calculating the overall condition score for the industrial equipment 118, the calculation engine 204 may compute a weighted average of the condition factor scores. More specifically, in this example, the calculation engine 204 may apply a predefined weight to each condition factor score (e.g., by multiplying the weight to the condition factor score) based on the relative impact of the corresponding condition factor to the overall condition. Once the weight is applied to each condition factor score, the calculation engine 204 may compute the average of the weighted values to produce the overall condition score.

The calculation engine 204 is further configured to compute aggregate condition data for various sets of industrial equipment. For example, the calculation engine 204 may compute aggregate condition data for a facility that includes a set of industrial equipment, an asset that includes a set of facilities, or a region that includes a set of assets. The aggregate condition data includes an overall aggregate condition score as well as one or more aggregate condition factor scores. Accordingly, in calculating aggregate condition data, the calculation engine 204 may aggregate respective condition factor scores (e.g., the condition factor score of each piece of equipment) corresponding to each condition factor to compute aggregate condition factor scores. The calculation engine 204 may further aggregate respective overall condition scores (e.g., the overall condition factor score of each piece of equipment) to compute an overall aggregate condition score.

The listener module 206 is configured to monitor incoming source data to detect any changes thereto. The listener module 206 detects changes to source data by comparing current source data to previous source data, and based on the comparison, determines whether a difference exists. For example, the listener module 206 may detect a change in value of sensor data produced by the sensors 116 by comparing current values in the sensor data to previous values in the sensor data and determining, based on the comparison, whether a difference exists between the two. In response to detecting a change to the source data, the listener module 206 causes the calculation engine 204 to dynamically re-compute one or more impacted condition factor scores. In other words, the listener module 206 causes the calculation engine 204 to compute one or more updated condition factor scores based on a detected difference in updated source data.

The edit/comment module 208 is responsible for processing user edits and comments related to condition data of the industrial equipment 118. To this end, the edit/comment module 208 may work in conjunction with the interface module 200 to display a comment component (e.g., a window), which is an interface element operable to provide further information about a particular condition factor score and receive user comments related to the condition factor score, or an editor component (e.g., a window), which is an interface element operable to receive user edits and comments related to condition factor scores. The comment and editor components both include a field for users to submit comments, and the editor component further provides interactive elements (e.g., a drop-down menu) to enable users to manually edit condition factor scores. The user comments may, for example, be in the form of text, image, audio, or video. The user comments may be related to an edit to a condition factor score or an overall condition score of a single piece of industrial equipment or a set of industrial equipment. The edit/comment module 208 updates scores based on the received user edits and stores each user comment in the database 212 with an association to the applicable piece of industrial equipment or set of industrial equipment. Additionally, the edit/comment module 208 works in conjunction with the interface module 200 to present the received user comments in the comment component. Depending on the type of comment received, the presentation of the comment may include displaying a textual comment, displaying all or part of a video file or image, or presenting all or part of an audio file.

Figure 20:
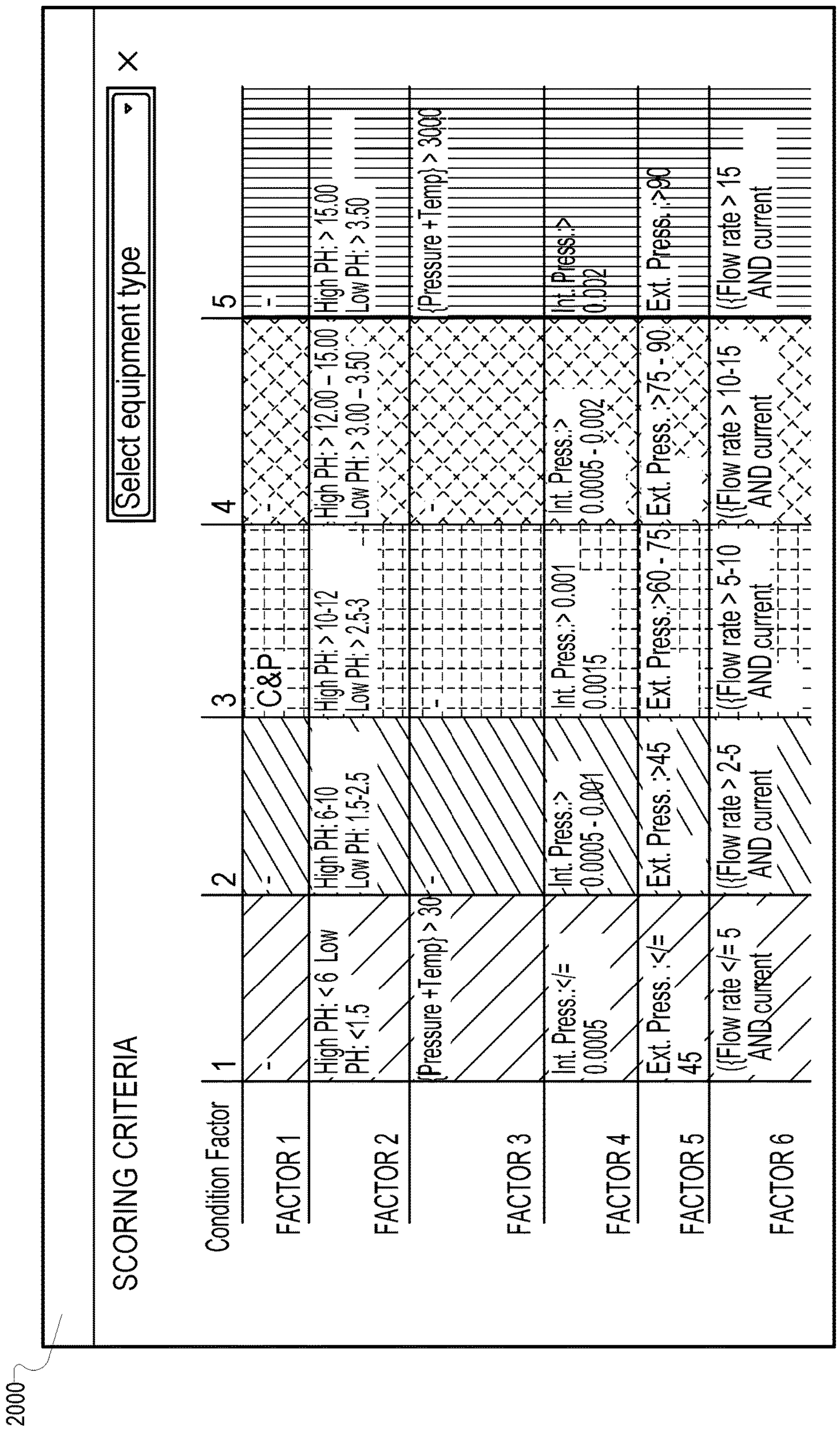
FIG. 20 is an interface diagram illustrating a portion of a UI that includes calculation criteria, according to some example embodiments.

In some embodiments, the UIs provided by the interface module 200 include a selectable element that allows users to access a user guide provided by the user guide module 210. The user guide module 210 may work in conjunction with the interface module 200 to provide the user guide in response to selection of the selectable element. The user guide provided by the user guide module 210 comprises calculation criteria 210A and calculation methodology 210B. The calculation criteria 210A specifies criteria used to determine the condition factor scores and hazard levels. For example, the calculation criteria may specify how underlying values (e.g., resulting from intermediate calculations) map to particular condition factor scores. The calculation methodology 210B specifies assumptions, formulas, and methods used to determine condition factor scores. Further details regarding the user guides provided by the user guide module 210 are illustrated in FIGS. 19 and 20 and discussed below in reference thereto, according to some example embodiments.

The database 212 is a network-accessible machine-readable storage medium. In addition to storing the equipment object corresponding to the industrial equipment 118, the database 212 stores equipment objects for multiple other pieces of equipment that may be distributed across multiple facilities, assets, and regions. Each equipment object includes information describing the equipment such as equipment identifiers, equipment age, equipment locations (e.g., facility, asset, or region), current and historic condition factor scores, and current and historic overall condition scores.

As is understood by skilled artisans in the relevant computer and Internet-related arts, each functional component (e.g., engine, module, or database) illustrated in FIG. 2 may be implemented using hardware (e.g., a processor of a machine) or a combination of logic (e.g., executable software instructions) and hardware (e.g., memory and processor of a machine) for executing the logic. Furthermore, the various functional components depicted in FIG. 2 may reside on a single machine (e.g., a server) or may be distributed across several machines in various arrangements such as cloud-based architectures. Moreover, any two or more of these components may be combined into a single component (e.g., a single module), and the functions described herein for a single component may be subdivided among multiple modules. Functional details of these modules are described below with respect to FIGS. 3-9.

Figure 3:
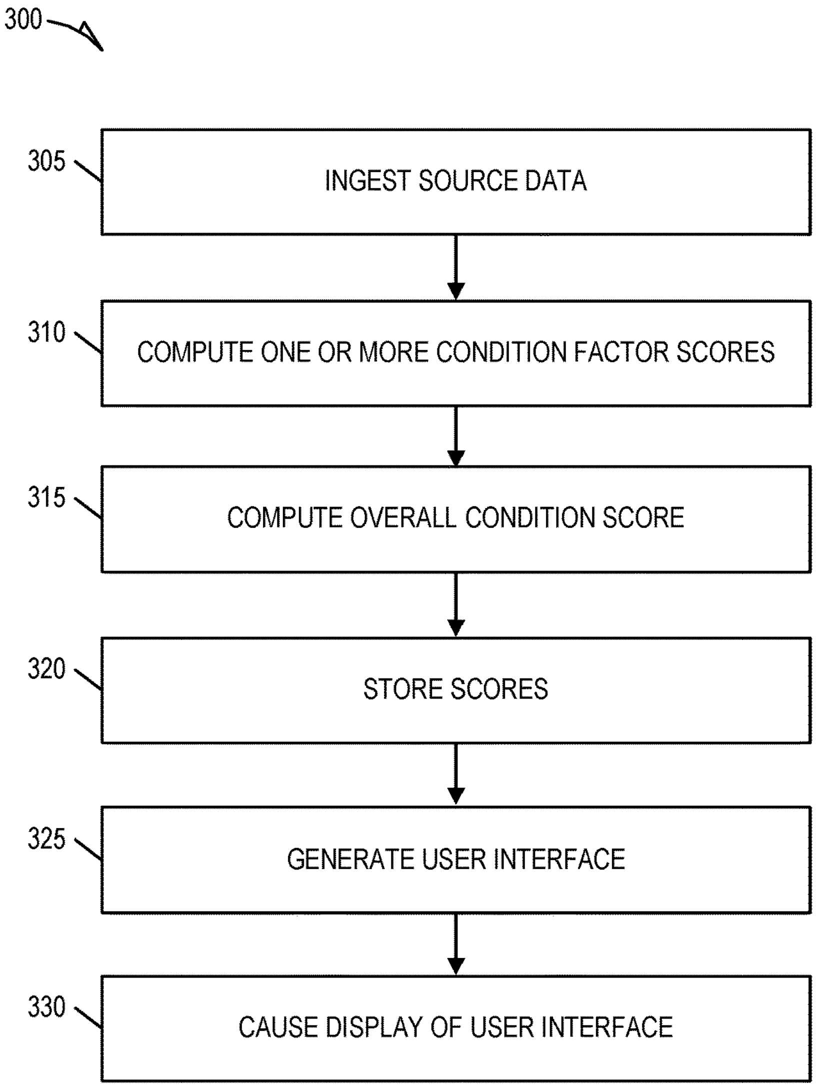
FIGS. 3-7 are flowcharts illustrating example operations of the real-time auditing system in performing a method for providing qualitative measures of an industrial equipment's condition, according to some embodiments.

FIG. 3 is a flowchart illustrating a method 300 for providing qualitative and quantitative measures of an industrial equipment's condition, according to some embodiments. The method 300 may be embodied in computer-readable instructions for execution by one or more processors such that the operations of the method 300 may be performed in part or in whole by the real-time auditing system 102; accordingly, the method 300 is described below by way of example with reference thereto. However, it shall be appreciated that at least some of the operations of the method 300 may be deployed on various other hardware configurations and the method 300 is not intended to be limited to the real-time auditing system 102.

At operation 305, the data retrieval module 202 ingests source data. The source data includes sensor data (e.g., sets of output data of sensors 116) and report data (e.g., human-generated reports) related to the industrial equipment 118. The source data may include multiple sets of sensor data (e.g., sensor data measuring various operational aspects of a piece of equipment). Each set of sensor data may correspond to the output of a particular sensor and may each include measurements of various operational aspects (e.g., functional attributes) of the industrial equipment 118 (e.g., engine or motor speed, torque, valve positions, precooler temperatures, deceleration, acceleration, pH, moisture, flow rate, altitude, depth/level, or flux). In ingesting the source data, the data retrieval module 202 performs operations including: obtaining sensor data from the sensors 116 (e.g., directly from the sensors 116 or from the third-party computing system 106); obtaining the report data from the third-party computing system 106; parsing the sensor data and the report data to identify data related to the industrial equipment 118; and storing the parsed source data in the database 212 for subsequent processing and analysis by the real-time auditing system 102. The data retrieval module 202 stores the parsed source data related to the industrial equipment 118 in association with or as part of an equipment object (e.g., a data structure) corresponding to the industrial equipment 118.

At operation 310, the calculation engine 204 computes one or more condition factor scores associated with the industrial equipment 118 based on the ingested source data. Each computed condition factor score provides a qualitative and quantitative measure of a condition factor that impacts an overall functional state of the industrial equipment. In computing each condition factor score, the calculation engine 204 accesses a predefined formula or set of formulas (e.g., from database 212) corresponding to the particular condition factor score being computed. Each formula may include one or more variables that correspond to the output of a particular sensor from the sensors 116. The calculation engine 204 evaluates the accessed formula or set of formulas using a portion of the source data (e.g., specific sensor data or report data corresponding to one or more variables included in the formula). In some instances, the calculation engine 204 may use the calculation methodology 210B to map intermediate values resulting from the evaluation of the formula to a particular condition factor score. For example, the calculation engine 204 may assign a condition factor score to particular condition factor of a piece of industrial equipment based on an underlying value (e.g., resulting from evaluation of the one or more predefined formulas)

At operation 315, the calculation engine 204 computes an overall condition factor score associated with the industrial equipment 118 based on the one or more condition factor scores. The overall condition factor score provides a qualitative and quantitative measure of an overall functional state of the industrial equipment 118. The calculation engine 204 computes the overall condition score by aggregating the condition factor scores computed for the industrial equipment 118. For example, in calculating the overall condition score for the industrial equipment 118, the calculation engine 204 may compute a weighted average of the condition factor scores.

At operation 320, the calculation engine 204 stores the computed one or more condition factor scores and the overall condition score, which collectively compose the condition data, in the database 212. The calculation engine 204 may store the condition data in association with or as part of the equipment object corresponding to the industrial equipment 118. The calculation engine 204 stores the one or more condition factor scores and the overall condition scores with an associated time stamp so as to maintain a record of condition factor scores and overall condition scores of the industrial equipment 118 over time.

At operation 325, the interface module 200 generates presentation data representing a portion of a UI for presenting the condition data (e.g., the one or more condition factor scores and the overall condition score). In generating the presentation data, the interface module 200 accesses the one or more condition factor scores and the overall condition score from the database 212 and incorporates them into the presentation data. The portion of the UI may correspond to either the table view or detailed view of condition data. In instances in which the UI corresponds to the detailed view, the interface module 200 may further access and incorporate variable values (e.g., sensor data values), formulas, and intermediate values (e.g., resulting from evaluation of a formula using one or more variable values) used by the calculation engine 204 into the presentation data.

The generating of the presentation data representing the portion of the UI may further include determining a hazard level associated with each condition factor based on the corresponding condition factor score, and assigning a visual indicator to the condition factor score based on the determined hazard level. Similarly, the generating of the presentation data may further include determining an overall hazard level of the industrial equipment 118 based on the overall condition score, and assigning a visual indicator to the overall hazard level based on the overall hazard level. Each hazard level may, for example, correspond to one of multiple coarsely granular relative rankings such as high, medium, and low. The determining of the hazard level may include comparing the score (either condition factor score or overall condition score) to a range of scores associated with each level, and determining, based on the comparison, the range in which the score falls. For example, condition factor scores of 0-4 may correspond to a high hazard level, scores of 5-7 may correspond to a medium hazard level, and scores of 8-10 may correspond to a low hazard level.

The visual indicator assigned to the condition factor score may include text corresponding to the coarsely granular relative ranking (e.g., "high," "medium," or "low") and in addition, or in the alternative, a color. For example, scores corresponding to a "high" hazard level may be displayed with a red colored indicator, scores corresponding to a "medium" hazard level may be displayed with a yellow colored indicator, and scores corresponding to a "low" hazard level may be displayed with a green colored indicator. Accordingly, the assigning of the visual indicator to a condition factor may include selecting a particular color from among multiple available colors based on, for example, information included in a look-up table.

Figure 15:
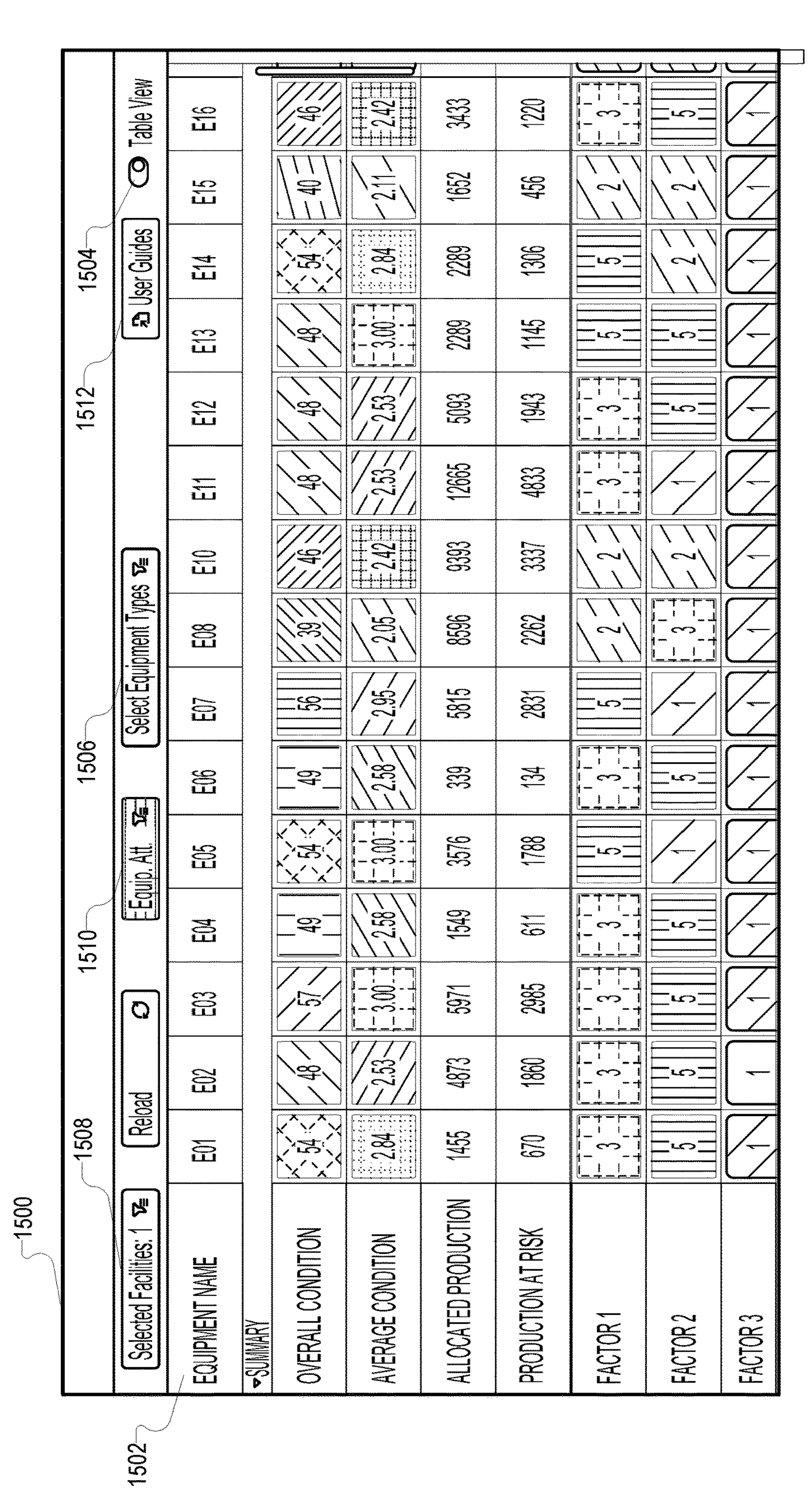
FIG. 15 is an interface diagram illustrating a portion of a UI that includes a table view of condition factor scores associated with a set of industrial equipment, according to some example embodiments.
Figure 17:
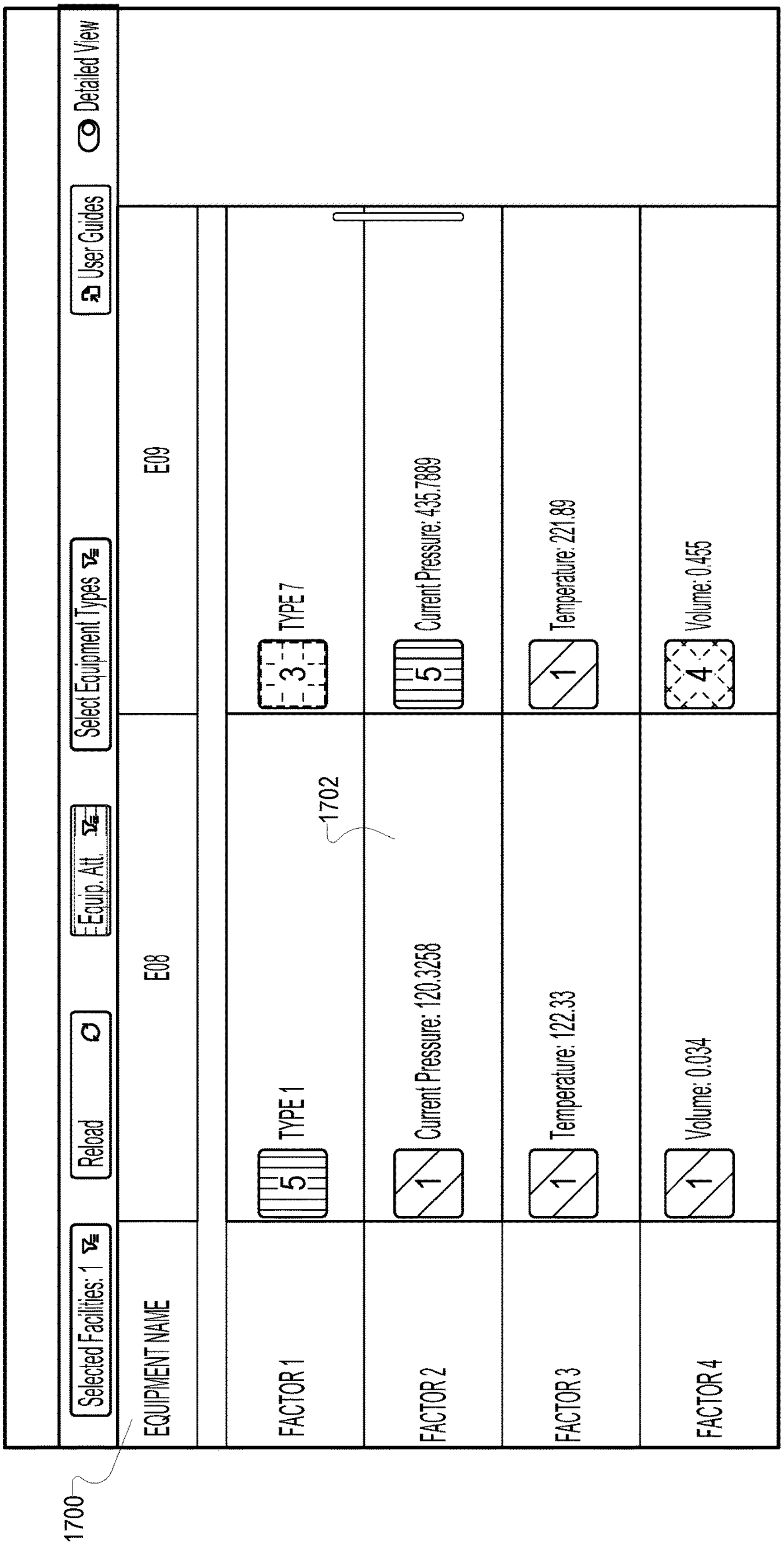
FIG. 17 is an interface diagram illustrating a portion of a UI that includes a detailed view of condition factor scores associated with a set of industrial equipment, according to some example embodiments.

At operation 330, the interface module 200 causes display of the portion of the UI (e.g., the table view or the detailed view) on the device 104. The interface module 200 may cause display of the UI on the device 104 by providing the device 104 (e.g., through electronic transmission) with the presentation data representing the portion of the UI and instructions that, when executed by the device 104, cause the device 104 to display the portion of UI. Examples of portions of the UI displayed by the device 104, according to some embodiments, are illustrated in FIGS. 10, 15, and 17 and discussed below in reference thereto.

Figure 4:
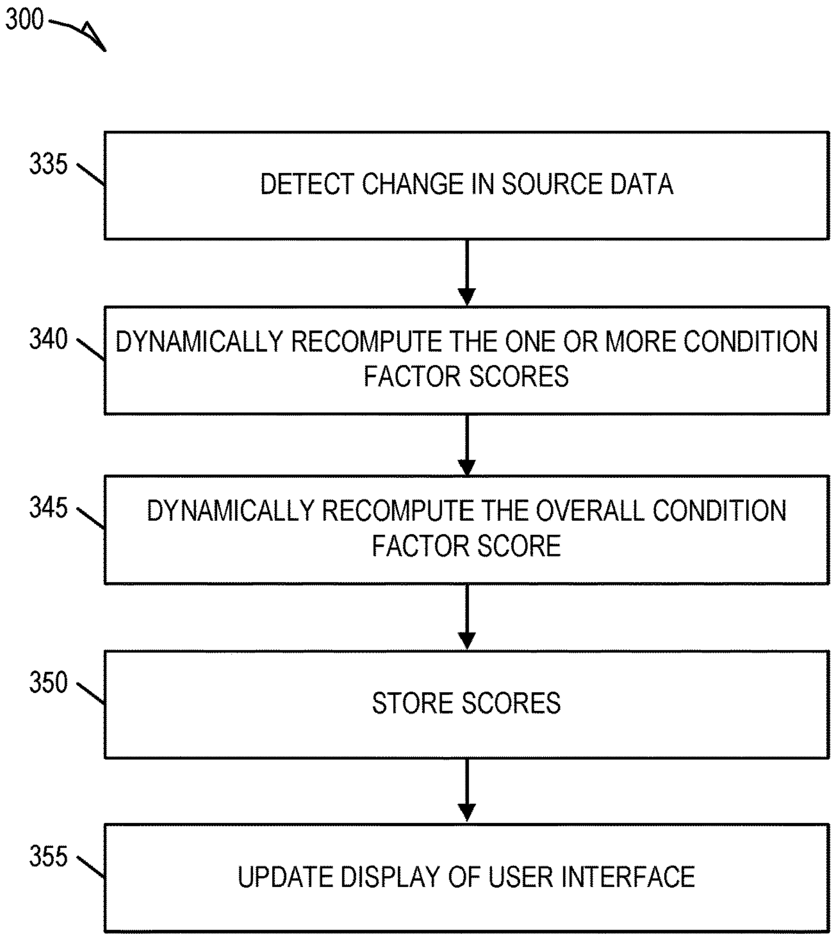

As shown in FIG. 4, the method 300 may, in some embodiments, also include operations 335, 340, 345, 350, and 355, which may be performed subsequent to the operation 330. At operation 335, the listener module 206 detects a change in the source data (e.g., the sensor data and the report data) associated with the industrial equipment 118 that is retrieved by the data retrieval module 202. The listener module 206 may detect the change based on a difference in values identified through a comparison of previous source data with current source data. For example, the listener module 206 compares previous values included in previous sensor data from the sensors 116 with current values included in current sensor data from the sensors 116, and the listener module 206 identifies a change to the sensor data based on a difference identified as a result of the comparison.

At operation 340, responsive to the listener module 206 detecting the change in the source data, the calculation engine 204 dynamically recomputes the one or more condition factor scores, the result of which is at least one updated condition factor score. In other words, the calculation engine 204 uses updated source data (e.g., changed source data) to update (e.g., recompute) the one or more condition factor scores.

At operation 345, responsive to the computation of at least one updated condition factor score, the calculation engine 204 dynamically recomputes the overall condition factor scores associated with the industrial equipment 118, the result of which is an updated overall condition score. In other words, the calculation engine 204 updates the overall condition score using the updated one or more condition factor scores.

At operation 350, the calculation engine 204 stores the updated one or more condition scores and the updated overall condition score in the database 212. The calculation engine 204 stores the updated one or more condition scores and the updated overall condition score as part of, or in association with, the equipment object corresponding to the industrial equipment 118 so as to maintain an association with current scores and historic scores.

At operation 355, the interface module 200 updates the portion of the UI displayed in the device 104 to include the updated one or more condition factor scores and the overall condition score associated with the industrial equipment 118. The updating of the UI includes replacing previous scores (e.g., condition factor scores or the overall condition score) in the presentation data with current (e.g., updated) scores. Additionally, the updating of the UI includes determining an updated hazard level based on current scores, and updating the visual indicator assigned to each condition factor based on the corresponding updated hazard level. As with the initial determination of hazard level, determining the updated hazard level may be based on which of multiple ranges (e.g., ranges of scores) the updated score falls into. In instances in which the portion of the UI being displayed corresponds to the detailed view, the updating of the display of the UI may further include updating one or more underlying variable values or other intermediate values to reflect changes to sensor data values in the source data.

Figure 5:
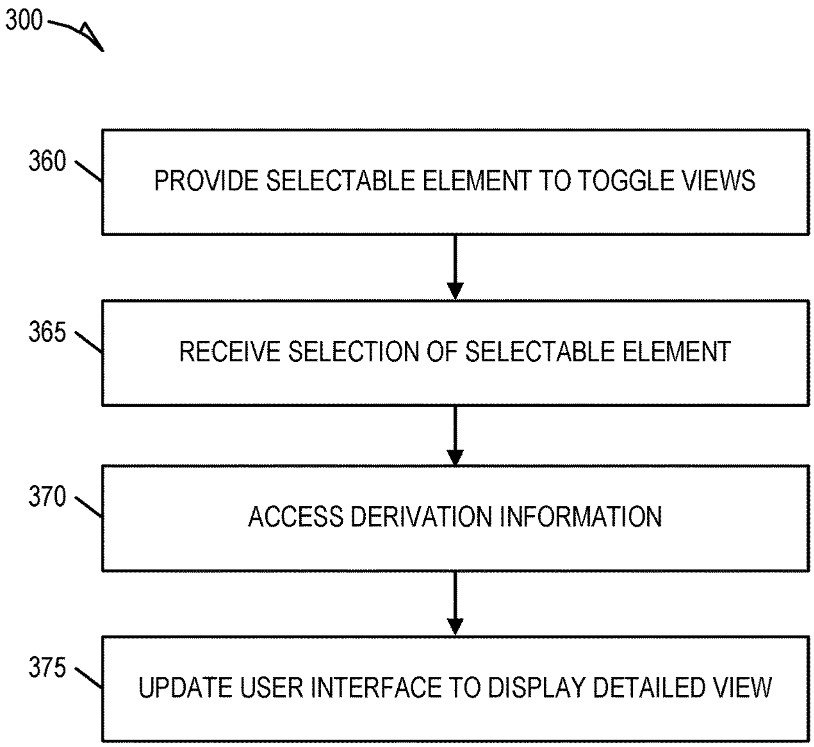

As shown in FIG. 5, the method 300 may, in some embodiments, also include operations 360, 365, 370, and 375, which may be performed subsequent to the operation 330, where the interface module 200 causes display of the portion of the UI on the device 104. In the context of operations 360, 365, 370, and 375, the portion of the UI that is caused to be displayed at operation 330 corresponds to a table view of condition data that includes condition factor scores associated with industrial equipment 118.

At operation 360, the interface module 200 provides a selectable element (e.g., a toggle button) within the UI that is operable (e.g., by way of user selection) to toggle the UI between the table view and a detailed view. The interface module 200 causes the selectable element to be presented in conjunction with the table view (e.g., in an area in the UI above the table view).

At operation 365, the interface module 200 receives user selection of the selectable element. The user selection may be accomplished using an input device (e.g., mouse or touch screen) of the device 104 on which the UI is being displayed.

In response to receiving the user selection, the interface module 200 accesses derivation information related to the condition factor scores displayed within the table view, at operation 370. For each condition factor score, the derivation information may include one or more underlying variable values (e.g., a sensor data value), one or more formulas used to generate the condition factor score using the one or more underlying variable values, and one or more intermediate values resulting from the evaluation of a formula using the one or more underlying variable values.

Also responsive to receiving the user selection, the interface module 200 updates the UI to present the detailed view that includes the derivation information, at operation 375. The updating of the UI may include providing (e.g., transmitting) the device 104 (e.g., through electronic transmission) with the presentation data representing the detailed view and further instructions that, when executed by the device 104, cause the device 104 to display the detailed view in place of the table view.

Figure 6:
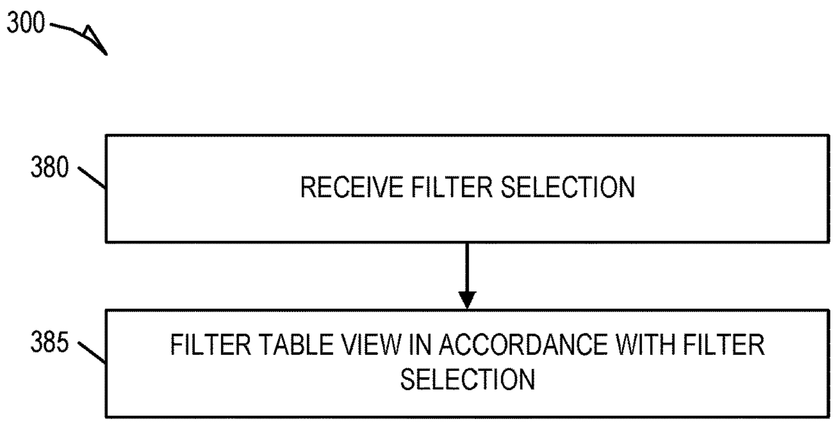

As shown in FIG. 6, the method 300 may, in some embodiments, also include operations 380 and 385, which may be performed subsequent to the operation 330, where the interface module 200 causes display of the portion of the UI on the device 104.

At operation 380, the interface module 200 receives, via the device 104, a filter selection from among multiple filters presented within the UI. The filters may, for example, include condition factor, equipment type, equipment attributes, and equipment location (e.g., facility).

At operation 385, the filter/sort module 201 of the interface module 200 filters the condition data presented in the portion of the UI in accordance with the filter selection. Depending on what other filter selections have been selected, if any, the filtering of the condition data by the filter/sort module 201 may include adding or removing one or more condition factors, condition factor scores, or pieces of industrial equipment from display within the portion of the UI (e.g., table view or detailed view). For example, upon receiving a filter selection corresponding to a particular condition factor, the filter/sort module 201 may remove condition factor scores for all condition factors except for the condition factor corresponding to the filter selection.

Figure 7:
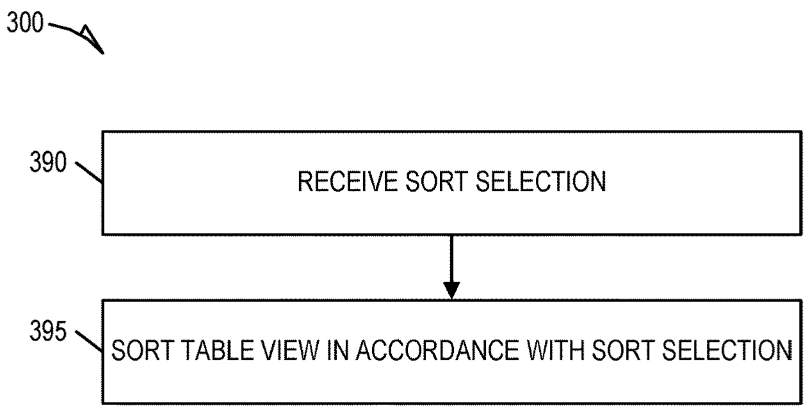

As shown in FIG. 7, the method 300 may, in some embodiments, also include operations 390 and 395, which may be performed subsequent to the operation 330, where the interface module 200 causes display of the portion of the UI on the device 104.

At operation 390, the interface module 200 receives a sort selection via the device 104. The sort selection may be specified by a user of the device 104 using one or more elements displayed in conjunction with the portion of the UI presented on the device 104. The sort selection may, for example, include a selection based on condition factor, condition factor score, equipment type, equipment attributes, and equipment location (e.g., facility).

At operation 395, the filter/sort module 201 of the interface module 200 sorts the condition data presented in the portion of the UI according to the sort selection. The sorting of the condition data by the filter/sort module 201 may include displaying condition factor scores according to a particular order and/or grouping.

Figure 8:
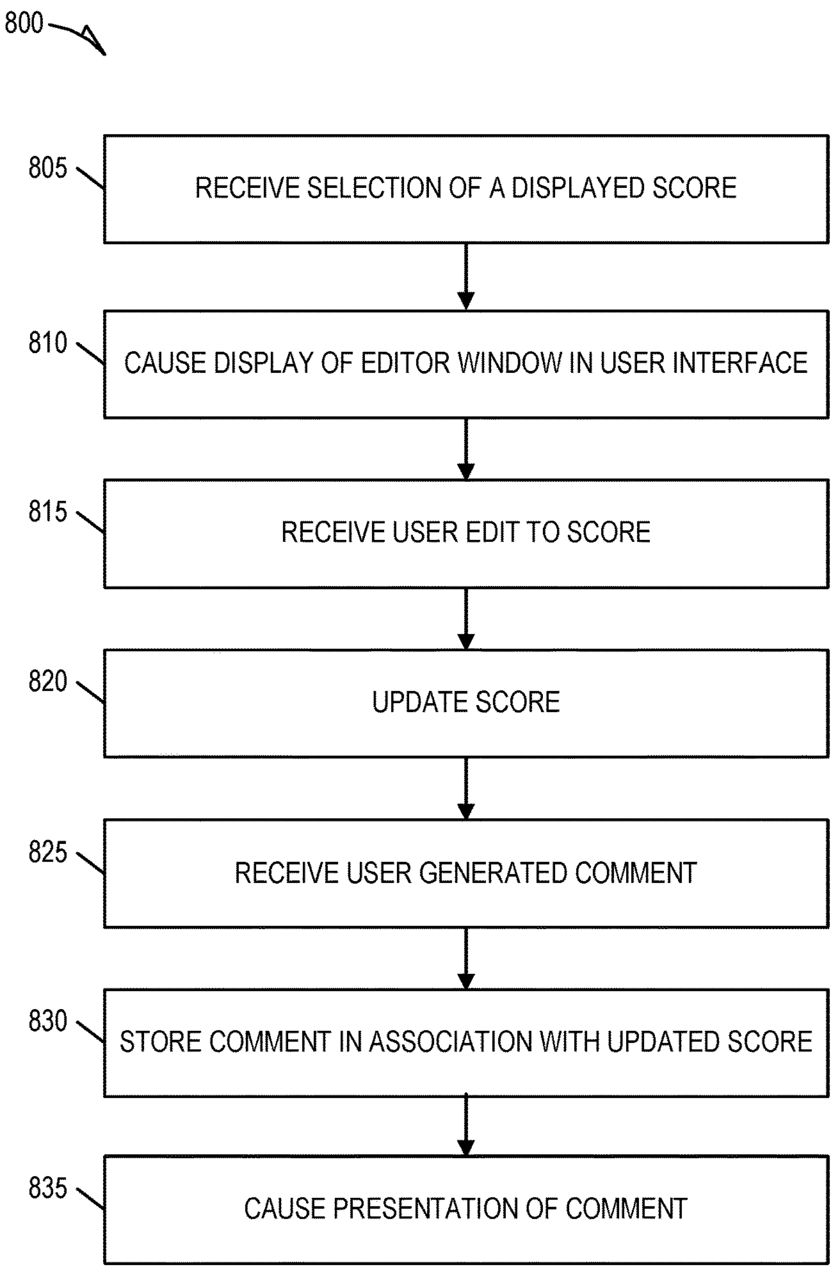
FIG. 8 is a flowchart illustrating a method for processing user submitted comments associated with condition data of industrial equipment, according to some embodiments.

FIG. 8 is a flowchart illustrating a method 800 for processing user submitted comments associated with a condition data of industrial equipment, according to some embodiments. The method 800 may be embodied in computer-readable instructions for execution by one or more processors such that the operations of the method 800 may be performed in part or in whole by the real-time auditing system 102; accordingly, the method 800 is described below by way of example with reference thereto. However, it shall be appreciated that at least some of the operations of the method 800 may be deployed on various other hardware configurations and the method 800 is not intended to be limited to the real-time auditing system 102.

At operation 805, the interface module 200 receives a user selection of a score displayed within a UI displayed on the device 104. The score may be either an overall condition score or a condition factor score. The user may select the score displayed in the UI through appropriate interaction with an input device (e.g., mouse click) of the device 104.

In response to receiving the user selection of the score, the interface module 200, working in conjunction with the edit/comment module 208, causes display of an editor component in the UI (e.g., by transmitting a set of machine-readable instructions to the device 104 that causes the device 104 to display the editor component) at operation 810. The editor component is a UI element operable (e.g., by user interaction) to facilitate manual editing of scores and receiving comments related to the edited score. The editor component may, accordingly, provide one or more interface elements (e.g., entry fields or buttons) that allow users to change scores and submit textual, audio, or video comments related to the selected score. For example, the comment component may include a drop-down menu to select a score and a text entry field for the user to enter a textual comment. As another example, the comment component may include one or more buttons that allow the user to record an audio or video comment, or a combination thereof.

Figure 16:
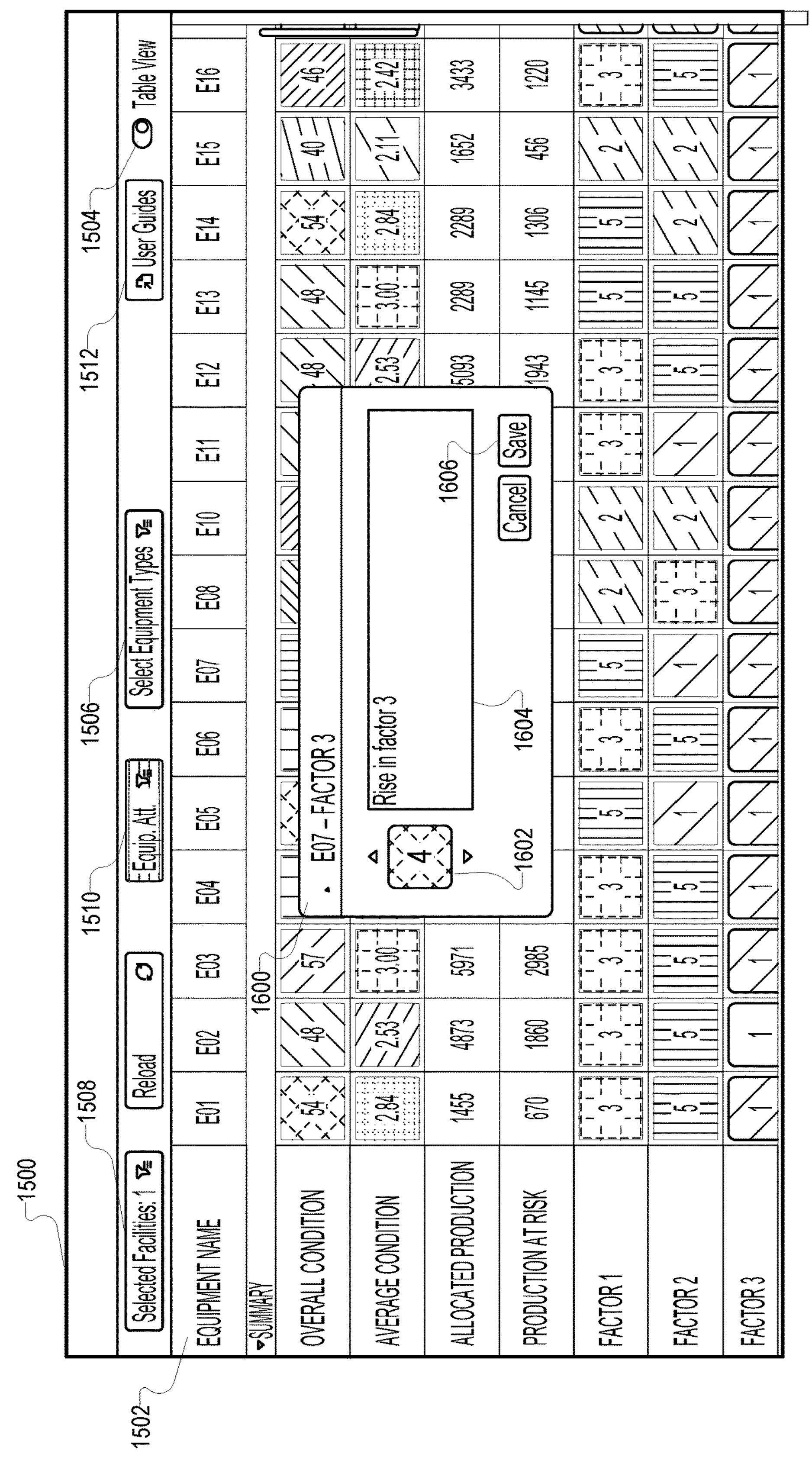
FIG. 16 is an interface diagram illustrating a portion of a UI for facilitating manual edits to condition factor scores and receiving comments related to a condition factor score, according to some embodiments.

The editor component may be displayed in conjunction with the score in the UI. For example, in response to receiving a selection of a score, the interface module 200 may cause the comment component to be presented overlaid upon a portion of the UI. An example editor component, according to some embodiments, is illustrated in FIG. 16 and described below in reference thereto.

At operation 815, the interface module 200, working in conjunction with the edit/comment module 208, receives a user edit to the score (e.g., via selection of a new score from a drop-down menu included in the editor component). At operation 820, the edit/comment module 208 updates the score according to the user edit. The updating of the score performed by the edit/comment module 208 may include modifying a value included in an equipment object to reflect the user edit to the score.

At operation 825, the interface module 200, working in conjunction with the edit/comment module 208, receives a user-generated (e.g., human-generated) comment input via the editor component. As noted above, the user generated comment may be in the form of text, audio, video, or various combinations thereof.

At operation 830, the edit/comment module 208 stores the user generated comment in association with the user-edited score. For example, the edit/comment module 208 may store the user-generated comment as part of the corresponding equipment object.

At operation 835, the interface module 200, working in conjunction with the edit/comment module 208, causes presentation of the user-generated comment within the comment component (e.g., by transmitting a set of machine-readable instructions to the device 104 that causes the device 104 to present the user-generated comment). Depending on the type of comment received, the presentation of the comment may include displaying a textual comment, displaying all or part of a video file, or presenting all or part of an audio file.

Figure 9:
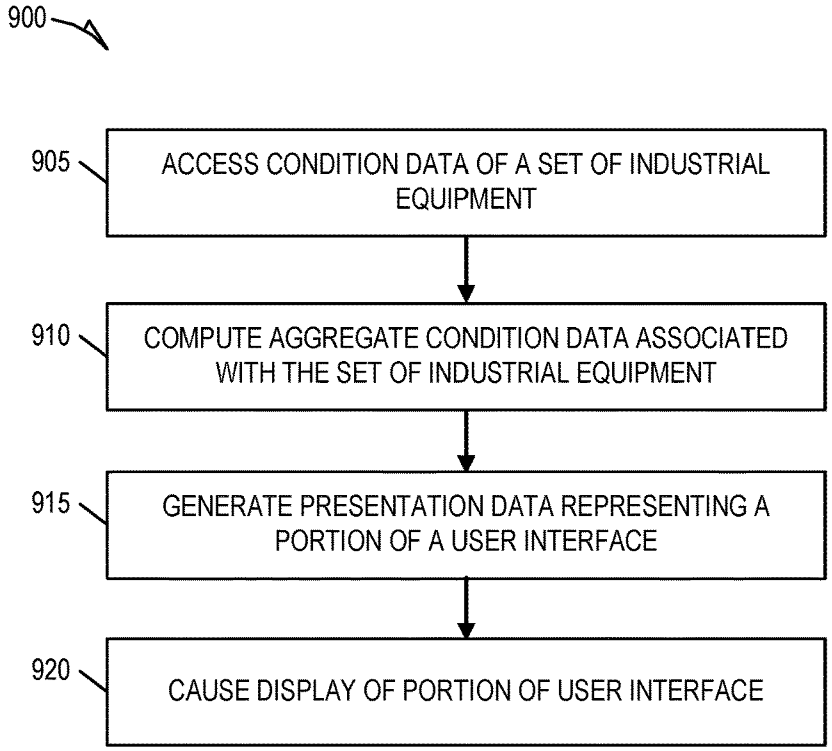
FIG. 9 is a flowchart illustrating a method for providing an aggregate view of condition data associated with a set of industrial equipment, according to some embodiments.

FIG. 9 is a flowchart illustrating a method 900 for providing an aggregate view of condition data associated with a set of industrial equipment, according to some embodiments. The method 900 may be embodied in computer-readable instructions for execution by one or more processors such that the operations of the method 900 may be performed in part or in whole by the real-time auditing system 102; accordingly, the method 900 is described below by way of example with reference thereto. However, it shall be appreciated that at least some of the operations of the method 900 may be deployed on various other hardware configurations and the method 900 is not intended to be limited to the real-time auditing system 102.

At operation 905, the calculation engine 204 accesses condition data associated with a set of industrial equipment. The condition data includes condition factor scores and overall condition scores of each piece of equipment in the set. The set of industrial equipment may, for example, correspond to a collection of equipment located at a particular facility, (e.g., a consumer product manufacturing facility, a chemical plant, an oil refinery, a drug manufacturing facility, an aircraft manufacturing facility, or an automotive manufacturing facility), multiple collections of equipment located across multiple facilities of a particular asset, or multiple collections of equipment located across multiple facilities of multiple different assets in a particular region (e.g., geographic region).

At operation 910, the calculation engine 204 computes an aggregate condition data for the set of industrial equipment. The aggregate condition data includes an overall aggregate condition score and one or more aggregate condition factor scores. Accordingly, the calculating of aggregate condition data may include, for each condition factor, aggregating (e.g., determining a weighted average) respective condition factor scores (e.g., the condition factor score of each piece of equipment) to compute an aggregate condition factor score. The calculation of aggregate condition data may further include aggregating (e.g., determining a weighted average) respective overall condition scores (e.g., the overall condition factor score of each piece of equipment) to compute an overall aggregate condition score.

At operation 915, the interface module 200 uses the aggregate condition data to generate presentation data representing a portion of a UI. The UI represented by the presentation data includes an identifier of the set of equipment (e.g., an identifier of the facility, asset, or region), the overall aggregate condition score, and the one or more aggregate condition factors.

At operation 920, the interface module 200 causes display of the portion of the UI on the device 104. For example, the interface module 200 may provide the device 104 with the presentation data representing the portion of the UI and a set of instructions that, when executed by the device 104, cause the device 104 to display the presentation data.

FIG. 10 is an interface diagram illustrating a portion of a UI 1000 (e.g., a table view) that includes a table 1002 of condition factor scores associated with a set of industrial equipment, according to some example embodiments. As shown, columns of the table 1002 correspond to individual pieces of equipment identified using an equipment identifier, and rows of the table 1002 correspond to condition factors that impact the overall functional state of the corresponding equipment. Accordingly, numeric values in each entry of the table 1002 correspond to a condition factor score of a particular piece of equipment for a particular condition factor. As an example, condition factor score 1004, which has a value of "1," provides a qualitative and quantitative measure of the impact of "Factor 10" on the overall functional state of industrial equipment "E10."

Additionally, each condition factor score included in the table 1002 includes a visual indicator (e.g., cross-hatching or lack of cross-hatching) of the hazard level represented by the corresponding condition factor score. Although the visual indicators illustrated in FIG. 10 include cross-hatching, the visual indicator of hazard level is not intended to be limited to cross-hatching, and it shall be appreciated that other visual indicators such as color may be used in other embodiments. As noted above, the visual indicator displayed for each condition factor score may depend on which one of multiple score ranges the condition factor score is within. For example, as shown in FIG. 10, condition factors scores in the range of 0-2 are presented without cross-hatching, condition factor scores of 3 are presented with right-hand cross-hatching, and condition factor scores in the range of 4-5 are presented with left-hand cross-hatching.

Figure 11:
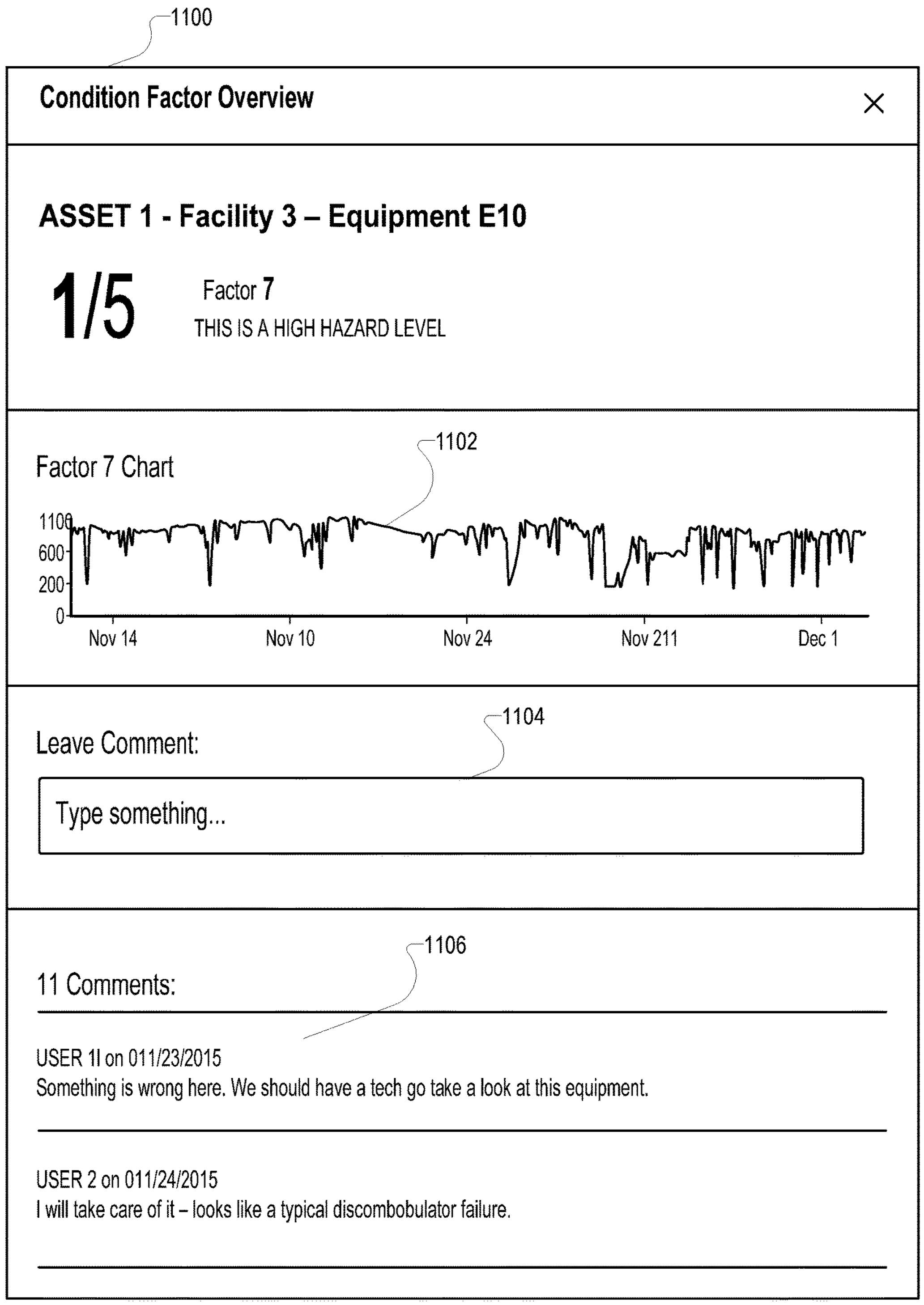
FIG. 11 is an interface diagram illustrating a portion of a UI for receiving and displaying textual comments related to a condition factor score, according to some embodiments.

A user selection of one of the condition factor scores included in the table 1002 (e.g., accomplished through placing the cursor over the value and selecting using a mouse click), results in the display of a comment component, an example of which is illustrated in FIG. 11, according to some embodiments. In particular, shown in FIG. 11 is a comment component 1100 that includes further information regarding the condition factor score 1004 for "Factor 10" for equipment "E10." More specifically, the comment component 1100 includes a graph 1102 that represents the condition factor score 1004 over time. Additionally, the comment component 1100 includes a text entry field 1104 for receiving user-generated comments related to the condition factor score 1004. As an example of such user-generated comments, the comment component 1100 also includes a comment section 1106 that includes a display of previously submitted textual comments related to condition factor score 1004.

Figure 12:
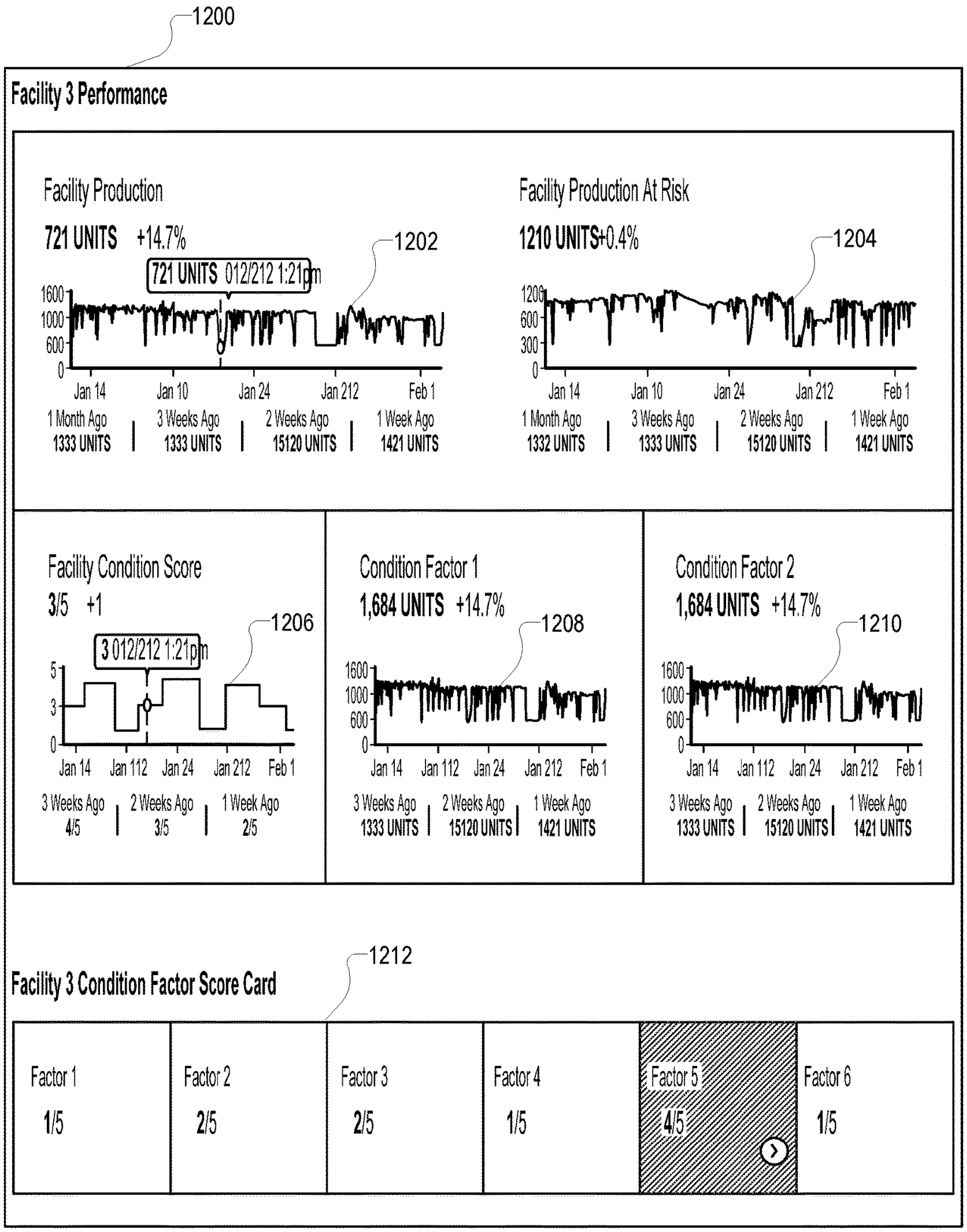
FIG. 12 is an interface diagram illustrating a portion of a UI for presenting aggregate condition data associated with a facility that includes a set of industrial equipment, according to some embodiments.

FIG. 12 is an interface diagram illustrating a portion of a UI 1200 for presenting aggregate condition data associated with a facility ("Facility 3") that includes a set of industrial equipment, according to some embodiments. In particular, the UI 1200 includes a graph 1202 that represents production of the facility (e.g., in number of units) over time, and a graph 1204 that represents production at risk (e.g., in number of units) over time. The UI 1200 also includes aggregate condition data for the facility. For example, graph 1206 represents the overall aggregate condition score of the facility over time. Further, graphs 1208 and 1210 represent aggregate condition factor scores for "Condition Factor 1" and "Condition Factor 2," respectively, over time. The UI 1200 further includes a condition score card 1212 that includes current aggregate condition factor scores for the facility.

Figure 13:
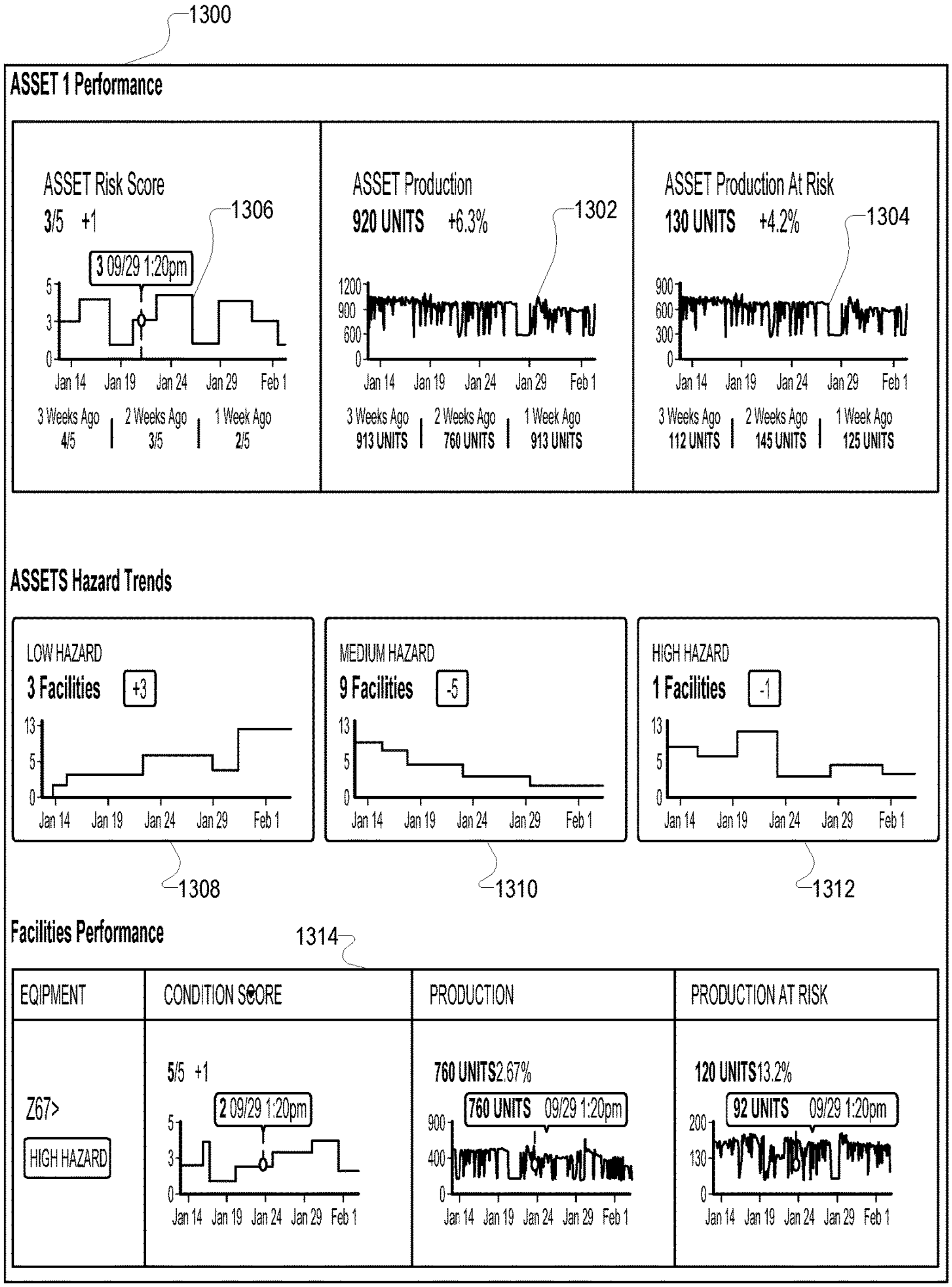
FIG. 13 is an interface diagram illustrating a portion of a UI for presenting aggregate condition data associated with an asset that includes a set of facilities, according to some embodiments.

FIG. 13 is an interface diagram illustrating a portion of a UI 1300 for presenting aggregate condition data associated with an asset ("Asset 1") that includes a set of facilities, according to some embodiments. The asset may, for example, be or include consumer product manufacturing facilities, chemical plants, oil drilling platforms, oil refineries, drug manufacturing facilities, aircraft manufacturing facilities, or automotive manufacturing facilities. The UI 1300 includes graph 1302 that represents the production of the asset (e.g., in number of units) over time, and a graph 1304 that represents production at risk (e.g., in number of units) over time. The UI 1300 also includes aggregate condition data for the asset. For example, graph 1306 represents the overall aggregate condition score of the asset over time. Graphs 1308, 1310, and 1312 show a number of facilities in the asset that are at each hazard level (e.g., low, medium, and high) over time.

The UI 1300 further includes information related to specific equipment located at the facility. For example, table 1314 includes information about each facility in the asset such as a facility identifier, a graph of overall condition score over time, a graph of production (e.g., in number of units) over time, and a graph of production at risk.

Figure 14:
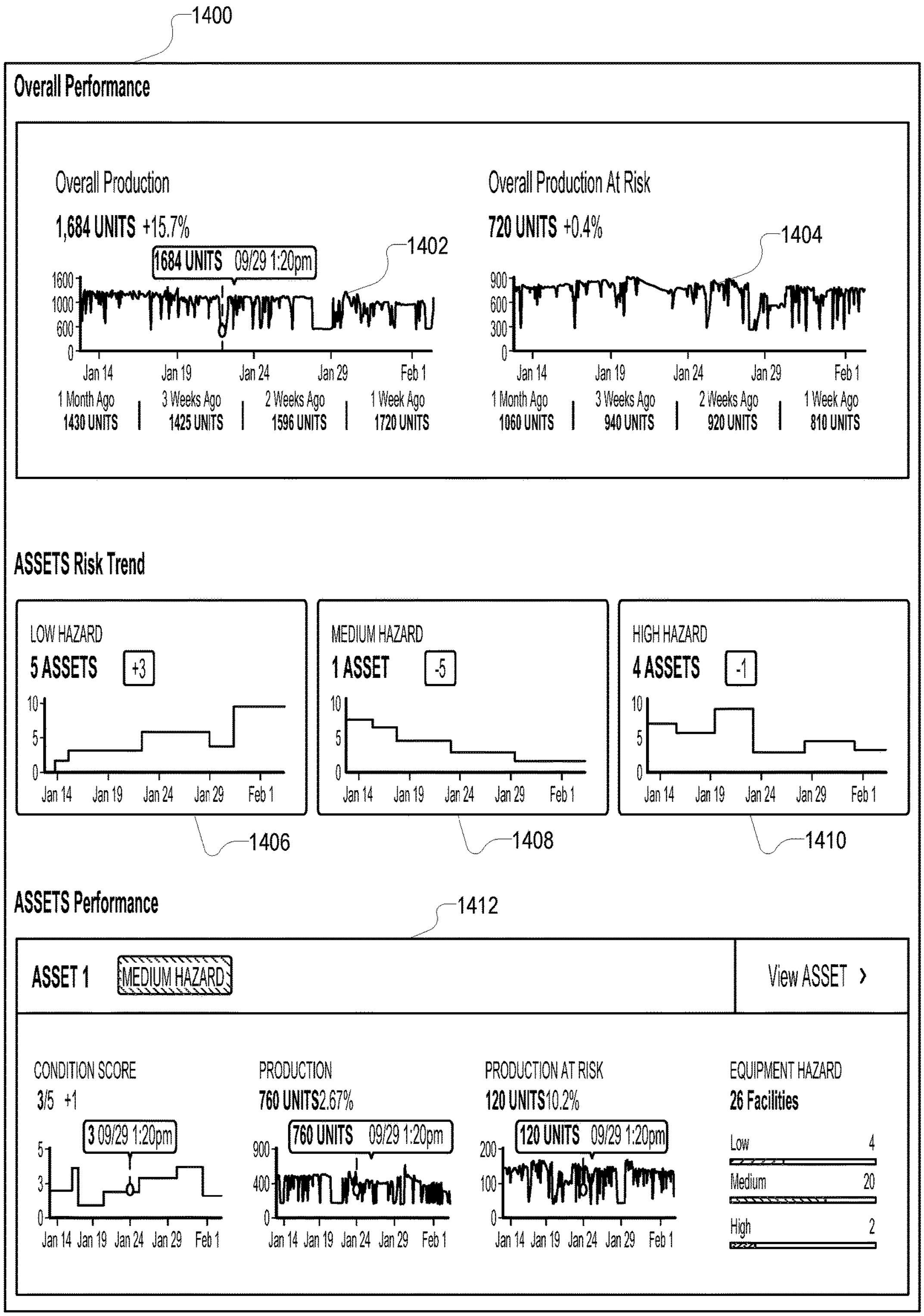
FIG. 14 is an interface diagram illustrating a portion of a UI for presenting aggregate condition data associated with a region that includes a set of assets, according to some embodiments.

FIG. 14 is an interface diagram illustrating a portion of a UI 1400 for presenting aggregate condition data associated with a region that includes a set of assets, according to some embodiments. In particular, the UI 1400 includes a graph 1402 that represents the production of the asset (e.g., in number of units) over time, and a graph 1404 that represents production at risk (e.g., in number of units) over time. Graphs 1406, 1408, and 1410 show a number of assets in the region that are at each hazard level (e.g., low, medium, and high) over time.

The UI 1400 further includes information related to specific equipment located at the facility. For example, table 1412 includes information about each asset in the region such as an asset identifier, a graph of overall condition score over time, a graph of production (e.g., in number of units) over time, a graph of production at risk, and a number of facilities at each hazard level (e.g., low, medium, and high).

FIG. 15 is an interface diagram illustrating a portion of a UI 1500 corresponding to a table view 1502 that includes a table of condition factor scores associated with a set of industrial equipment, according to some example embodiments. Similar to the table 1002 discussed above, the columns of the table in the table view 1502 correspond to individual pieces of equipment identified using an equipment identifier, and rows of the table correspond to condition factors that impact the overall functional state of the corresponding equipment. Accordingly, numeric values in each entry of the table correspond to a condition factor score of a particular piece of equipment for a particular condition factor.

A user selection of one of the condition factor scores included in the table (e.g., accomplished through placing the cursor over the value and selecting using a mouse click), results in the display of an editor component, an example of which is illustrated in FIG. 16, according to some embodiments. In particular, shown in FIG. 16 is an editor window 1600 that include a counter 1602 and text entry field 1604. The counter 1602 is operable by a user to manually edit the score by either incrementing or decrementing the value using the up or down arrows, respectively. The text entry field 1604 is operable by a user to enter a textual comment related to the user edit to the score. Upon selection of the button 1606, the edit/comment module 208 updates the score according to the user edit, and stores the comment in association with the score.

With reference back to FIG. 15, the UI 1500 includes a toggle button 1504 that is operable by a user to switch between display of the table 1502 and a detailed view, an example of which is displayed in FIG. 17. As shown in FIG. 17, a detailed view 1700 includes a breakdown of condition factor scores for condition factors of a set of equipment. More specifically, the detailed view 1700 includes derivation information related to each displayed condition score. The derivation information provides details related to how corresponding condition factor scores are generated. For example, derivation information 1702 includes underlying values (e.g., variable values) used in generating the condition factor score for "FACTOR 2".

Figure 18:
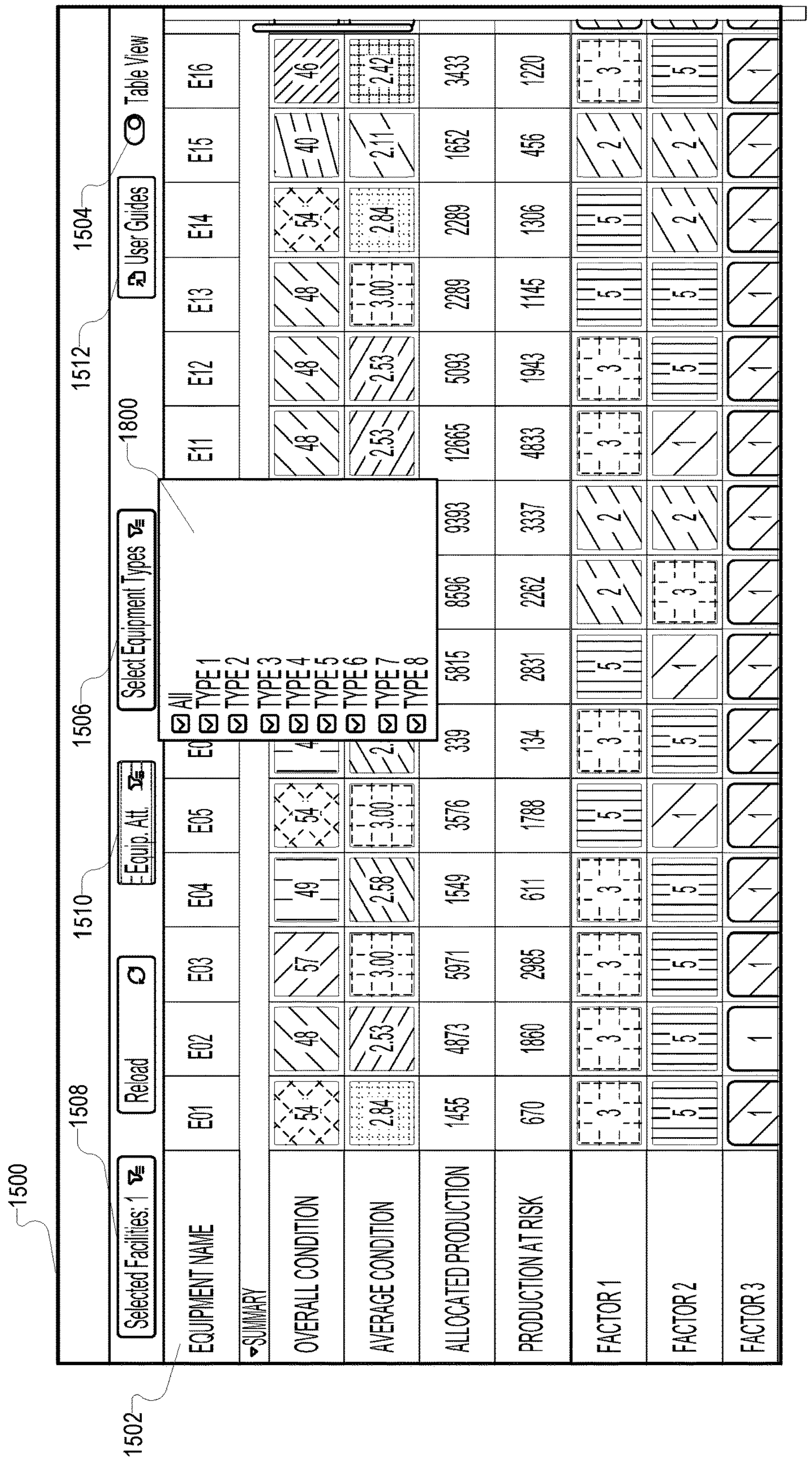
FIG. 18 is an interface diagram illustrating a portion of a UI that includes a drop-down menu having multiple filter selections for filtering condition factor scores displayed in the table view, according to some example embodiments.

With reference again to FIG. 15, selection of button 1506 results in display of a drop-down menu that includes a list of filters selectable by a user (also referred to as "filter selections"), an example of which is illustrated in FIG. 18. In particular, FIG. 18 illustrates a drop-down menu 1800 presented in conjunction with the table view 1502. A user may select one or more of the filters from the drop-down menu 1800 to filter the information displayed in the table of the table view 1502 according to equipment type.

Similarly, with reference yet again back to FIG. 15, selection of either of buttons 1508 or 1510 results in display of an additional drop-down menu that includes a list of additional filters selectable by the user. In particular, selection of button 1508 results in a display of location filters (e.g., facilities or regions), and selection of button 1510 results in a display of equipment attribute filters. Further, selection of user guides button 1512 provides a user the option to view a calculation methodology or calculation criteria.

An example of the view of a calculation methodology 1900 is illustrated in FIG. 19. As shown in FIG. 19, the calculation methodology 1900 includes assumptions, formulas, and methods used to compute condition factor scores. An example calculation criteria 2000 is illustrated in FIG. 20. As shown in FIG. 20, the calculation criteria specifies criteria used to determine the condition factor scores and hazard levels.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Example Machine Architecture and Machine-Readable

Figure 21:
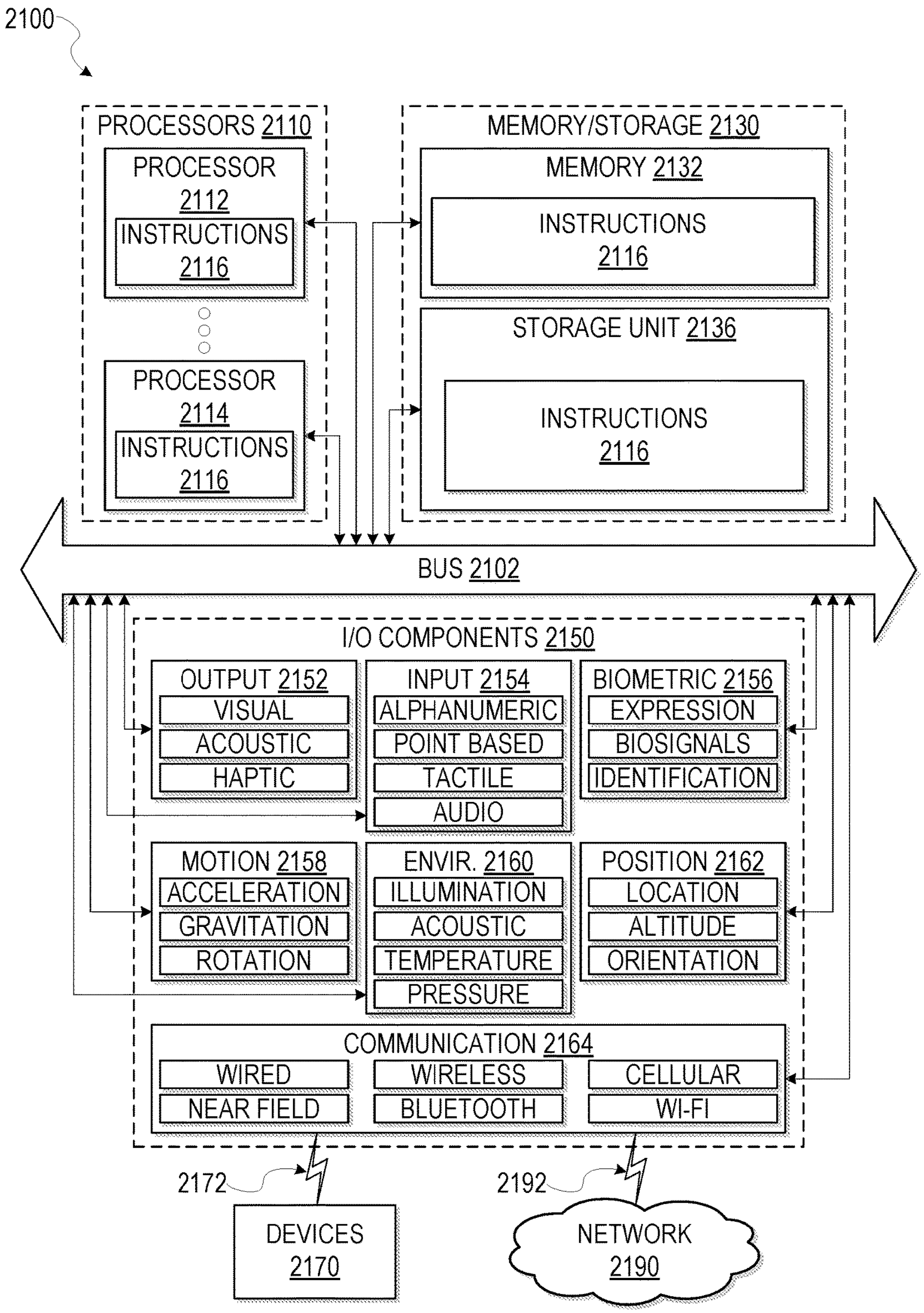
FIG. 21 is a diagrammatic representation of a machine in the example form of a computer system within which a set of instructions for causing the machine to perform any one or more of the methodologies discussed herein may be executed.

FIG. 21 is a block diagram illustrating components of a machine 2100, according to some example embodiments, able to read instructions from a machine-readable medium (e.g., a machine-readable storage medium) and perform any one or more of the methodologies discussed herein. Specifically, FIG. 21 shows a diagrammatic representation of the machine 2100 in the example form of a computer system, within which instructions 2116 (e.g., software, a program, an application, an applet, an app, or other executable code) for causing the machine 2100 to perform any one or more of the methodologies discussed herein may be executed. Additionally, or alternatively, the machine 2100 may correspond to any one of the real-time auditing system 102, device 104, or the third-party computing system 106. The instructions 2116 transform the general, non-programmed machine into a particular machine programmed to carry out the described and illustrated functions in the manner described. In alternative embodiments, the machine 2100 operates as a standalone device or may be coupled (e.g., networked) to other machines. In a networked deployment, the machine 2100 may operate in the capacity of a server machine or a client machine in a server-client network environment, or as a peer machine in a peer-to-peer (or distributed) network environment. The machine 2100 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2116, sequentially or otherwise, that specify actions to be taken by the machine 2100. Further, while only a single machine 2100 is illustrated, the term "machine" shall also be taken to include a collection of machines 2100 that individually or jointly execute the instructions 2116 to perform any one or more of the methodologies discussed herein.

The machine 2100 may include processors 2110, memory/storage 2130, and input/output (I/O) components 1250, which may be configured to communicate with each other such as via a bus 2102. In an example embodiment, the processors 2110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 2112 and a processor 2114 that may execute the instructions 2116. The term "processor" is intended to include multi-core processor that may comprise two or more independent processors (sometimes referred to as "cores") that may execute instructions contemporaneously. Although FIG. 21 shows multiple processors 2110, the machine 2100 may include a single processor with a single core, a single processor with multiple cores (e.g., a multi-core processor), multiple processors with a single core, multiple processors with multiples cores, or any combination thereof.

The memory/storage 2130 may include a memory 2132, such as a main memory, or other memory storage, and a storage unit 2136, both accessible to the processors 2110 such as via the bus 2102. The storage unit 2136 and memory 2132 store the instructions 2116 embodying any one or more of the methodologies or functions described herein. The instructions 2116 may also reside, completely or partially, within the memory 2132, within the storage unit 2136, within at least one of the processors 2110 (e.g., within the processor's cache memory), or any suitable combination thereof, during execution thereof by the machine 2100. Accordingly, the memory 2132, the storage unit 2136, and the memory of the processors 2110 are examples of machine-readable media.

As used herein, "machine-readable medium" means a device able to store instructions and data temporarily or permanently, and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 2116. The term "machine-readable medium" shall also be taken to include any medium, or combination of multiple media, that is capable of storing instructions (e.g., instructions 2116) for execution by a machine (e.g., machine 2100), such that the instructions, when executed by one or more processors of the machine (e.g., processors 2110), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the machine-readable medium is non-transitory in that it does not embody a propagating signal. However, labeling the tangible machine-readable medium "non-transitory" should not be construed to mean that the medium is incapable of movement; the medium should be considered as being transportable from one real-world location to another. Additionally, since the machine-readable medium is tangible, the medium may be considered to be a machine-readable storage device.

The I/O components 1250 may include a wide variety of components to receive input, provide output, produce output, transmit information, exchange information, capture measurements, and so on. The specific I/O components 1250 that are included in a particular machine will depend on the type of machine. For example, portable machines such as mobile phones will likely include a touch input device or other such input mechanisms, while a headless server machine will likely not include such a touch input device. It will be appreciated that the I/O components 1250 may include many other components that are not shown in FIG. 21. The I/O components 1250 are grouped according to functionality merely for simplifying the following discussion and the grouping is in no way limiting. In various example embodiments, the I/O components 1250 may include output components 2152 and input components 2154. The output components 2152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2154 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1250 may include biometric components 2156, motion components 2159, environmental components 2160, or position components 2162 among a wide array of other components. For example, the biometric components 2156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 2158 may include acceleration sensor components (e.g., accelerometer), gravitation sensor components, rotation sensor components (e.g., gyroscope), and so forth. The environmental components 2160 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 2162 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1250 may include communication components 2164 operable to couple the machine 2100 to a network 2190 or devices 2170 via a coupling 2192 and a coupling 2172, respectively. For example, the communication components 2164 may include a network interface component or other suitable device to interface with the network 2190. In further examples, the communication components 2164 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2170 may be another machine or any of a wide variety of peripheral devices (e.g., a peripheral device coupled via a Universal Serial Bus (USB)).

Moreover, the communication components 2164 may detect identifiers or include components operable to detect identifiers. For example, the communication components 2164 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF4210, Ultra Code, UCC RSS-2D bar code, and other optical codes), or acoustic detection components (e.g., microphones to identify tagged audio signals). In addition, a variety of information may be derived via the communication components 2164, such as location via Internet Protocol (IP) geo-location, location via Wi-Fi® signal triangulation, location via detecting an NFC beacon signal that may indicate a particular location, and so forth.

Transmission Medium

In various example embodiments, one or more portions of the network 2190 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 2190 or a portion of the network 2190 may include a wireless or cellular network and the coupling 2192 may be a Code Division Multiple Access (CDMA) connection, a Global System for Mobile communications (GSM) connection, or another type of cellular or wireless coupling. In this example, the coupling 2192 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 2116 may be transmitted or received over the network 2190 using a transmission medium via a network interface device (e.g., a network interface component included in the communication components 2164) and using any one of a number of well-known transfer protocols (e.g., HTTP). Similarly, the instructions 2116 may be transmitted or received using a transmission medium via the coupling 2172 (e.g., a peer-to-peer coupling) to the devices 2170. The term "transmission medium" shall be taken to include any intangible medium that is capable of storing, encoding, or carrying the instructions 2116 for execution by the machine 2100, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

In this document, the terms "a" or "an" are used, as is common in patent documents, to include one or more than one, independent of any other instances or usages of "at least one" or "one or more." In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," "third," and so forth are used merely as labels, and are not intended to impose numerical requirements on their objects.

What is claimed is:

1. A system comprising:

one or more processors of a machine; and a memory storing instructions that, when executed by the one or more processors, causes the machine to perform operations comprising:

causing presentation, on a display of a computer device, of a user interface comprising a table view of condition factor scores associated with industrial equipment, each of the condition factor scores providing a measure of a factor that impacts an overall functional state of the industrial equipment, each of the condition factor scores computed based in part on source data that includes output data produced by one or more sensors coupled to the industrial equipment;

causing presentation of an editor window operable to edit a condition factor score from among the condition factor scores;

receiving, via the editor window, a user edit to the condition factor score;

updating the table view of condition factor scores based on the user edit, the updating of the table view including updating the condition factor score in accordance with the user edit;

providing, within the user interface, a first selectable element operable to toggle the user interface between the table view and a detailed view of the condition factor scores, the first selectable element being presented in conjunction with the table view;

in response to user selection, via the computer device, of the first selectable element:

accessing, from a data store, derivation information related to at least one condition factor score, the derivation information including at least one formula and at least one sensor value used in calculating the at least one condition factor score, the at least one sensor value being included in the output data produced by one or more sensors coupled to the industrial equipment;

updating the user interface to present the detailed view, the detailed view presenting the derivation information that includes the at least one formula and the at least one sensor value used in calculating the at least one condition factor score;

providing, within the user interface, a second selectable element operable to access a user guide associated with the condition factor scores, the user guide comprising calculation criteria and calculation methodology; and causing display of at least one of the calculation criteria and the calculation methodology in response to receiving selection of the second selectable element.

2. The system of claim 1, wherein the operations further comprise:

receiving, via the computer device, a filter selection from among a plurality of filters presented in conjunction with the table view; and filtering the table view in accordance with the filter selection.

3. The system of claim 2, wherein the plurality of filters include filters based on condition factor, equipment type, a plurality of equipment attributes, and equipment location.

4. The system of claim 1, wherein the operations further comprise:

receiving, via the computer device, a sort selection from the table view; and sorting the table view in accordance with the sort selection.

5. The system of claim 4, wherein the sort selection is selected from a group consisting of sorts based on condition factor, condition factor score, equipment type, equipment attributes, and equipment location.

6. The system of claim 1, wherein the operations further comprise:

receiving, via the computer device, user selection of the condition factor score from among the condition factor scores;

wherein the causing of the presentation of the editor window is in response to receiving the user selection.

7. The system of claim 1, wherein:

the editor window comprises a text entry field to receive a textual comment associated with the user edit; and the operations further comprise:

receiving the textual comment entered into the text entry field of the editor window; and storing the textual comment in association with the particular condition factor score.

8. The system of claim 1, wherein:

the output of the one or more sensors includes a measurement related to a functional aspect of a piece of industrial equipment.

9. The system of claim 1, wherein the operations further comprise:

detecting a change to the source data; and responsive to detecting the change to the source data:

updating the at least one variable value based on the change to the source data;

dynamically recomputing the at least one condition factor score using the at least one updated variable value; and updating the detailed view to include the at least one updated variable value and the at least one recomputed condition factor score.

10. A method comprising:

causing presentation, on a display of a computer device, of a user interface comprising a table view of condition factor scores associated with industrial equipment, each of the condition factor scores providing a measure of a factor that impacts an overall functional state of the industrial equipment, each of the condition factor scores computed based in part on source data that includes output data produced by one or more sensors coupled to the industrial equipment;

causing presentation of an editor window operable to edit a condition factor score from among the condition factor scores;

receiving, via the editor window, a user edit to the condition factor score;

updating the table view of condition factor scores based on the user edit, the updating of the table view including updating the condition factor score in accordance with the user edit;

providing, within the user interface, a first selectable element operable to toggle the user interface between the table view and a detailed view of the condition factor scores, the first selectable element being presented in conjunction with the table view;

in response to user selection, via the computer device, of the first selectable element:

accessing, from a data store, derivation information related to at least one condition factor score, the derivation information including at least one formula and at least one sensor value used in calculating the at least one condition factor score, the at least one sensor value being included in the output data produced by one or more sensors coupled to the industrial equipment;

updating, using one or more processors of a machine, the user interface to present the detailed view, the detailed view presenting the derivation information that includes the at least one formula and the at least one sensor value used in calculating the at least one condition factor score;

providing, within the user interface, a second selectable element operable to access a user guide associated with the condition factor scores, the user guide comprising calculation criteria and calculation methodology; and causing display of at least one of the calculation criteria and the calculation methodology in response to receiving selection of the second selectable element.

11. The method of claim 10, further comprising:

receiving, via the computer device, a filter selection from among a plurality of filters presented in conjunction with the table view; and filtering the table view in accordance with the filter selection.

12. The method of claim 11, wherein the plurality of filters include filters based on condition factor, equipment type, a plurality of equipment attributes, and equipment location.

13. The method of claim 10, further comprising:

receiving, via the computer device, a sort selection from the table view; and sorting the table view in accordance with the sort selection.

14. The method of claim 13, wherein the sort selection is selected from a group consisting of sorts based on condition factor, condition factor score, equipment type, equipment attributes, and equipment location.

15. The method of claim 10, further comprising:

receiving, via the computer device, user selection of the condition factor score from among the condition factor scores;

wherein the causing of the presentation of the editor window is in response to receiving the user selection.

16. The method of claim 10, wherein:

the editor window comprises a text entry field to receive a textual comment associated with the user edit; and the method further comprises:

receiving the textual comment entered into the text entry field of the editor window; and storing the textual comment in association with the particular condition factor score.

17. The method of claim 16, wherein:

the output of the one or more sensors includes a measurement related to a functional aspect of a piece of industrial equipment.

18. A machine-readable hardware storage device embodying instructions that, when executed by at least one processor of a machine, cause the machine to perform operations comprising:

causing presentation, on a display of a computer device, of a user interface comprising a table view of condition factor scores associated with industrial equipment, each of the condition factor scores providing a measure of a factor that impacts an overall functional state of the industrial equipment, each of the condition factor scores computed based in part on source data that includes output data produced by one or more sensors coupled to the industrial equipment;

causing presentation of an editor window operable to edit a condition factor score from among the condition factor scores;

receiving, via the editor window, a user edit to the condition factor score;

updating the table view of condition factor scores based on the user edit, the updating of the table view including updating the condition factor score in accordance with the user edit;

providing, within the user interface, a first selectable element operable to toggle the user interface between the table view and a detailed view of the condition factor scores, the first selectable element being presented in conjunction with the table view;

in response to user selection, via the computer device, of the first selectable element:

accessing, from a data store, derivation information related to at least one condition factor score, the derivation information including at least one formula and at least one sensor value used in calculating the at least one condition factor score, the at least one sensor value being included in the output data produced by one or more sensors coupled to the industrial equipment;

updating the user interface to present the detailed view, the detailed view presenting the derivation information that includes the at least one formula and the at least one sensor value used in calculating the at least one condition factor score;

providing, within the user interface, a second selectable element operable to access a user guide associated with the condition factor scores, the user guide comprising calculation criteria and calculation methodology; and causing display of at least one of the calculation criteria and the calculation methodology in response to receiving selection of the second selectable element.

* * * * *